United States Patent [19]
Kim

[11] Patent Number: 4,779,975
[45] Date of Patent: Oct. 25, 1988

[54] INTERFEROMETRIC SENSOR USING TIME DOMAIN MEASUREMENTS

[75] Inventor: Byoung Y. Kim, Menlo Park, Calif.

[73] Assignee: The Board of Trustees of the Leland Stanford Junior University, Stanford, Calif.

[21] Appl. No.: 66,734

[22] Filed: Jun. 25, 1987

[51] Int. Cl.$^4$ .................. G01B 9/02; G01C 19/64
[52] U.S. Cl. .................... 356/345; 250/227; 356/350
[58] Field of Search ............... 356/345, 350; 250/227

[56] References Cited

U.S. PATENT DOCUMENTS

| | | | |
|---|---|---|---|
| 4,299,490 | 11/1981 | Cahill et al. | 356/350 |
| 4,372,685 | 2/1983 | Ulrich | 356/350 |
| 4,386,822 | 6/1983 | Bergh | 350/96.15 |
| 4,456,377 | 7/1984 | Shaw et al. | 356/350 |
| 4,469,397 | 9/1984 | Shaw et al. | 350/96.15 |
| 4,493,528 | 1/1985 | Shaw et al. | 350/96.15 |
| 4,529,312 | 7/1985 | Pavlath et al. | 356/350 |
| 4,536,058 | 8/1985 | Shaw et al. | 350/96.15 |
| 4,556,321 | 12/1985 | Schiffner | 356/350 |
| 4,564,293 | 1/1986 | Newton et al. | 356/350 |
| 4,634,282 | 1/1987 | Shaw et al. | 356/350 |
| 4,634,852 | 1/1987 | Shaw | 356/345 X |
| 4,637,722 | 1/1987 | Kim | 356/350 |
| 4,671,658 | 6/1987 | Shaw et al. | 356/350 |
| 4,687,330 | 8/1987 | Lefevre | 356/350 |
| 4,697,926 | 10/1987 | Youngquist et al. | 356/345 |
| 4,699,513 | 10/1987 | Brooks et al. | 356/345 |

FOREIGN PATENT DOCUMENTS 1154955 10/1983 Canada.
2100855A 1/1983 United Kingdom.

OTHER PUBLICATIONS

Martin et al., "Fiber Optic Laser Gyro Signal Detection and Processing Technique," *SPIE*, vol. 139, 1978, pp. 98–102.

J. L. Davis et al., "Techniques for Shot Noise Limited Inertial Rotation Measurement Using a Multiturn Fiber Sagnac Interferometer," *SPIE*, vol. 157, 1978, pp. 131–136.

M. R. Layton et al., "Optical Fiber Acoustic Sensor Utilizing Mode—Mode Interference," *Applied Optics*, vol. 18, No. 5, Mar. 1, 1979, pp. 666–670.

J. L. Davis et al., "Closed–Loop Low–Noise Fiber–Optic Rotation Sensor," *Optics Letters*, vol. 6, No. 10, Oct. 1981, pp. 505–507.

Thomas G. Giallorenzi et al., "Optical Fiber Sensor Technology," *IEEE Journal of Quantum Electronics*, vol. QE-18, No. 4, Apr. 1982, pp. 626–665.

H. Lefevre, "Contribution a la Gyrometrie a Fibre Optique de Classe Inertielle," Thesis Presentation at the University of Nice, July 1, 1982, Section C-III.3, pp. 187–189.

(List continued on next page.)

Primary Examiner—Vincent P. McGraw
Attorney, Agent, or firm—Knobbe, Martens, Olson & Bear

[57] ABSTRACT

An interferometer used as a rotation sensor is constructed using a strand of optical fiber, a portion of which is formed into a sensing loop. A pair of light waves are caused to counterpropagate in the sensing loop and are combined to form an optical output signal that has an intensity that varies in accordance with the difference in the phases of the two counterpropagating light waves. A phase modulator is positioned on the optical fiber in the sensing loop at a location such that the two counterpropagating light waves are modulated approximately 180 degrees out of phase. The time-varying phase modulation causes a time-varying phase difference that is combined with a rotationally-induced Sagnac effect phase to provide a total phase difference that is detected by a photodetector. The photodetector provides an electrical output signal this is differentiated to provide a differentiated output signal that has zero-crossings that correspond to maxima and minima of the electrical output signal. The time intervals between selected zero-crossings are measured and the rotationally-induced phase difference caused by the Sagnac effect is calculated from the measured time intervals. The rotation rate is then calculated from the Sagnac phase difference.

28 Claims, 10 Drawing Sheets

OTHER PUBLICATIONS

Toshihiko Yoshino et al., "Fiber-Optic Fabry-Perot Interferometer and Its Sensor Applications," *IEEE Journal of Quantum Electronics*, vol. QE-18, No. 10, Oct. 1982, pp. 1624-1633.

I. P. Giles et al., "Coherent Optical-Fiber Sensors with Modulated Laser Sources," *Electronics Letters*, vol. 19, No. 1, Jan. 6, 1983, pp. 14-15.

G. Meltz et al., "Cross-Talk Fiber-Optic Temperature Sensor," *Applied Optics*, vol. 22, No. 3, Feb. 1, 1983, pp. 464-477.

B. Y. Kim et al., "Harmonic Feed-Back Approach to Fiber Gyroscale Factor Stabilization," *International Conference on Optical Fibre Sensors*, London, Apr. 26-28, 1983 (2 pp.).

Ralph A. Bergh et al., "An Overview of Fiber-Optic Gyroscopes," *Journal of Lightwave Technology*, vol. LT-2, No. 2, Apr. 1984, pp. 91-107.

B. Y. Kim et al., "All-Fiber-Optic Gyroscope with Linear Scale Factor Using Phase Detection," *SPIE*, vol. 478, pp. 142-148.

B. Y. Kim et al., "Gated Phase-Modulation Feedback Approach to Fiber-Optic Gyroscopes," *Optics Letters*, vol. 9, No. 6, Jun. 1984, pp. 263-265.

B. Y. Kim et al., "Gated Phase-Modulation Approach to Fiber-Optic Gyroscope with Linearized Scale Factor," *Optics Letters*, vol. 9, No. 8, Aug. 1984, pp. 375-377.

B. Y. Kim et al., "Phase-Reading, All-Fiber-Optic Gyroscope," *Optics Letters*, vol. 9, No. 8, Aug. 1984, pp. 378-380.

B. Yoon Kim et al., "Fiber-Optic Gyroscopes," *IEEE Spectrum*, Mar. 1986, pp. 56-60.

H. C. Lefevre et al., "Progress in Optical Fiber Gyroscopes Using Integrated Optics," *37th Meeting/Specialists' Meeting of the Electromagnetic Wave Propagation Panel on Guided Optical Structures in the Military Environment*, Istanbul, Turkey, Sep. 23-27, 1985, pp. 1-12.

Kim, "All-Fiber-Optic Gyroscope with Extended Linear Dynamic Range," Report #0888, Edward L. Linzton Lab., W. W. Hanson Laboratories of Physics, Stanford University, Jun. 1985.

INTERFEROMETRIC SENSOR USING TIME DOMAIN MEASUREMENTS

BACKGROUND OF THE INVENTION

Field of the Invention

The present invention relates to optical interferometers, and, more particularly, to interferometric sensors such as fiber optic gyroscopes.

Description of the Related Art

Fiber optic rotation sensors typically include a loop of fiber optic material to which light waves are coupled such that a pair of light waves propagate around the loop in opposite directions (i.e., the two light waves are counterpropagating). When the loop is rotated, a relative phase difference is induced between the counterpropagating light waves in accordance with the well-known "Sagnac effect." The amount of phase difference corresponds to the rotational velocity of the loop. The counterpropagating light waves, when recombined, interfere constructively or destructively to produce an optical output signal that varies in intensity in accordance with the rotation rate of the loop. Rotation sensing is commonly accomplished by detection of this optical output signal.

A number of devices and techniques have been developed to process the detected optical output signal to provide an electrical output signal that represents the velocity and direction of rotation of the loop. Known devices and techniques monitor the intensity of the optical output signal to measure the phase difference between the counterpropagating light waves to determine the rotational velocity and direction in accordance with the Sagnac equation:

$$\Delta\Phi_R = \frac{8\pi NA}{\lambda c} Q \quad (1)$$

where:

$\Delta\Phi_R$ is the Sagnac phase difference caused by rotation of the optical loop;
A is the area bounded by the optical loop in which the light waves counterpropagate;
N is the number of times that the light waves propagate around the loop before being recombined;
q is the angular velocity of the loop about an axis that is perpendicular to the plane of the loop; and
$\lambda$ and c are the free space values of the wavelength and velocity, respectively, of the light waves applied to the optical loop.

The intensity of the optical output signal is a function of the Sagnac phase difference $\Delta\Phi_R$ between the two counter-propagating light waves as follows:

$$I_T = I_1 + I_2 + 2\sqrt{I_1 I_2} \cos(\Delta\Phi_R) \quad (2)$$

where $I_T$ is the intensity of the optical output signal, and $I_1$ and $I_2$ are the individual intensities of the two counterpropagating light waves.

It has been found that simple measurement of the intensity of the optical output signal will not provide sufficient information from which the direction and rate of rotation can be determined. For example, the sensitivity of the phase difference measurement is effectively zero for phase differences that are integral multiples of $\pi$ (i.e., $\Delta\Phi_R = N\pi$ for $N = \ldots -2, -1, 0, 1, 2, \ldots$) because the interference intensity is an even, periodic function of the phase difference (i.e., the interference intensity varies as a cosine function as set forth in Equation 2 above. Thus, small phase differences cannot be directly measured near a zero rotation rate. Typically, this difficulty in measuring small phase differences is overcome by dynamic biasing wherein an additional phase modulation is introduced into the closed path around which the light waves are propagating. A time-varying modulation with a zero mean amplitude is generally used rather than a static modulation. The dynamic biasing causes the phase signal to reach values where the sensitivity is suitably large so that the phase difference is readily measurable.

A gyroscope with dynamic biasing can be readily used to measure small rotation rates. When the phase modulation is a harmonic signal of a predetermined frequency, a small phase shift caused by the rotation of the optical loop causes the intensity of the optical output signal to include a time-varying component at the predetermined frequency. This time-varying component can be demodulated to provide a measure of the Sagnac phase shift and thus the rotation rate. Although the dynamic biasing allows phase differences to be measured with high sensitivity at low rotation rates, the rotation-induced interference intensity is periodic and thus cannot be used directly to measure high rotation rates.

In order to provide an extended dynamic range for measuring rotation rates, two basic approaches have been used. One approach is to provide a feedback signal from the demodulated optical output signal to a second device in the optical loop. The second device provides an additional, controllable, non-reciprocal phase difference and the feedback signal is varied so as to null the demodulated optical output signal. The feedback signal required to null the demodulated optical output signal is monitored to measure the Sagnac phase shift and thus the rotation rate. The performance of this type of closed-loop gyroscope depends in part upon the stability, linearity and phase range of the non-reciprocal phase shifter used for the second device and upon the characteristics of the electronics that provides the feedback signal.

An alternative approach to extending the dynamic range of an optical fiber gyroscope is an open-loop approach wherein no feedback is provided to null the demodulated output signal. All the information necessary to reconstruct the Sagnac phase difference is included in the interference intensity caused by the combination of the rotation and the dynamic modulation. Typically, extensive signal processing is required to extract the phase difference information from the optical output signal when the phase difference is not limited to values near zero. When an extended dynamic range is to be attained, the signal processing can be quite demanding. In many designs of open-loop optical gyroscopes and other interferometers, the quality of the electronic signal processing circuitry, rather than the quality of the optical circuit, determines the dynamic range and accuracy of the sensing system.

Both analog and digital processing may be used to process the optical output signal, and, it is preferable that most of the processing be performed in the digital domain. However, typical commercially available analog-to-digital convertors needed to convert the analog electrical representation of the optical output signal to digital data do not have sufficient dynamic range to provide quality digital processing. Thus, complex analog circuitry is typically required as part of the electronics that processes the optical output signal. Other electronic circuitry has been used that relies less heavily upon digital processing. However, generally, the electronic components must be carefully selected and stabilized in order to achieve the high accuracy that is required to provide a sensitive interferometer with an extended dynamic range.

SUMMARY OF THE INVENTION

The present invention includes an interferometric sensor for sensing an ambient effect. The sensor comprises an interferometer having first and second optical paths. At least one of the optical paths is configured for exposure to the ambient effect. The interferometer includes a coupling device which couples the optical paths such that first and second light waves propagating in the optical paths interfere at the coupling device to form an optical output signal. The output signal has a waveform defined by phase differences between the two light waves. A modulator is coupled to at least the first optical path to modulate the phase of light propagating through the first optical path. The modulator causes a time varying phase difference between the first and second light waves at the coupling device. The waveform includes first and second predetermined points spaced in time. The two points have a time domain separation which is responsive to the ambient effect. The interferometer further includes a signal processing circuit and a photodetector. The signal processing circuit detects the time domain separation between the first and second points to sense the ambient effect.

In a rotation sensor constructed in accordance with the present invention, the optical paths are formed by a loop of optical fiber, and the ambient effect is a rotationally induced Sagnac effect.

In particular embodiments of the invention, the predetermined points correspond to points of zero slope of the waveform. One of the points corresponds to a first maximum of the waveform, and the other of the points corresponds to a second maximum of the waveform. Alternatively, the two points correspond to first and second minima of the waveform.

In a exemplary embodiment, the signal processing circuit comprises a differentiator that differentiates the waveform to provide a differentiated waveform, and the two predetermined points correspond to zero-crossings of the differentiated waveform. The signal processing circuit further includes a zero-crossing detector that detects the zero-crossings corresponding to the predetermined points, and a circuit that measures the time domain separation between the zero crossings.

In preferred embodiments of the invention, the waveform includes third and fourth predetermined points, and the circuit measures the time domain separation between the third and fourth points. The signal processing circuit further comprises a comparator that compares the time domain separation of the first and second points with the time domain separation of the third and fourth points to dynamically measure changes in the phase excursion of the modulator.

Preferably, the phase excursion caused by the modulator is at least $2\pi$ radians so as to produce well-defined maxima and minima in the waveform of the output signal. In exemplary embodiments, the phase excursion ranges from a value between $\pi$ and $2\pi$ radians to a value between $-\pi$ and $-2\pi$ radians.

The present invention further includes a method of sensing an ambient effect that comprises the steps of propagating first and second light waves in first and second optical paths, and combining the pair of light waves after propagation through the optical path to form an optical output signal. The method further includes the steps of varying the phase of the light waves to cause the optical output signal to vary in accordance with a waveform that includes two predetermined points having a time-domain separation responsive to the ambient effect, and sensing the two predetermined points to measure the ambient effect. In an exemplary method of rotation sensing in accordance with the present invention, the optical paths are formed by a loop of optical fiber, and the first and second light waves counterpropagate in the loop.

Preferably, the two predetermined points comprise points of zero slope on the waveform, and the sensing step comprises measuring the time-domain separation between the points of zero slope. The sensing step includes the steps of differentiating the waveform to provide a second waveform having zero crossings corresponding to the points of zero slope, and detecting the zero crossings to measure the time-domain separation.

In the preferred embodiment, the interferometer is a Sagnac interferometer having an open loop configuration, as opposed to a closed loop configuration. As is well known, in a closed loop interferometer the optical output signal is fed back to drive the phase modulator, typically to null the output signal. The magnitude of the driving signal is indicative of the rotation rate. In contrast, an open loop gyroscope does not utilize such feedback, and the rotation information is contained in, and obtained directly from, the optical output signal. By utilizing an open loop configuration, the present invention eliminates complex feedback responsive modulation circuits. When utilized with a digital detection scheme, the invention is elegant in its simplicity.

DETAILED DESCRIPTION OF THE PREFERRED EMBODIMENT

Figure 1:
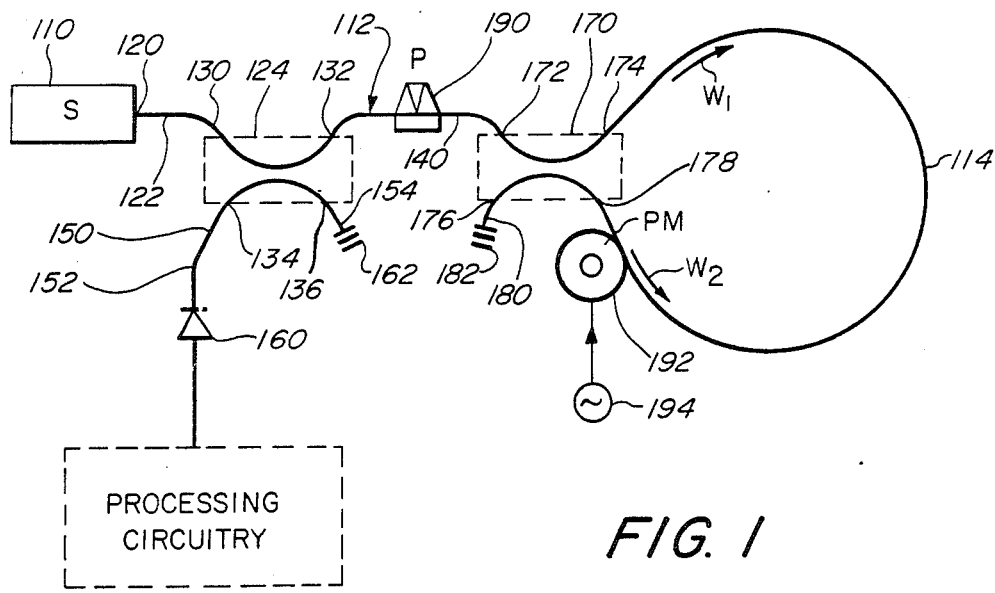
FIG. 1 is a schematic drawing of a Sagnac interferometer, showing fiber optic components positioned along a continuous, uninterrupted length of fiber optic material, and further showing a photodetector that detects the optical output signal and processing circuitry to process the electrical signal generated by the photodetector.

A shown in FIG. 1, an open loop rotation sensor 100 includes a light source 110 that introduces light into a continuous length of a first optical fiber 112. A portion of the first optical fiber 112 is wound into a sensing loop 114. The first optical fiber 112 is preferably a single-mode optical fiber having, for example, an outer cladding diameter of about 80 microns and an inner core diameter of about 4 microns. The single-mode fiber 112 is preferably a high birefringence fiber, although non-birefringent fiber may also be utilized. The sensing loop 114 comprises a plurality of turns of the first optical fiber 112 wrapped around a spool or other support (not shown). By way of specific example, the sensing loop 114 may comprise approximately 1000 turns of the first optical fiber 112 wound on a form having a diameter of approximately 14 centimeters.

Preferably, the sensing loop 114 is wound symmetrically, starting from the center of the length of fiber in the loop 114, so that symmetrical points in the loop are in proximity. Symmetrical winding of the sensing loop 114 reduces the environmental sensitivity of the rotation sensor 100 because the symmetry causes time-varying temperature and pressure gradients to have a similar effect on both counterpropagating waves in the sensing loop 114.

Light from the light source 110 is optically coupled to one end of the first optical fiber 112 by, for example, butting a first end 120 of the first optical fiber 112 against the light source 110. An input end portion (or first end portion) 122 of the first optical fiber 112 provides an optical path from the first end 120 to a first directional coupler 124 that is formed on the first optical fiber 112. The first directional coupler 124 is advantageously constructed in accordance with U.S. Pat. Nos. 4,493,528 and 4,536,058, which are incorporated herein by reference. The first directional coupler 124 has a first port 130, a second port 132, a third port 134, and a fourth port 136. The first optical fiber 112 passes through the first directional coupler 124 between the first port 130 and the second port 132, and continues as an intermediate portion 140 of the first optical fiber 112. Within the first directional coupler 124, the first optical fiber 112 is juxtaposed with a second optical fiber 150 which may be of the same type as the first fiber 112. The second fiber 150 has a first end portion 152 and a second end portion 154. The first end portion 152 of the second optical fiber extends from the third port 134 of the first directional coupler 124 and is optically coupled to a photodetector 160. The second end portion 154 extends from the fourth port 136 of the first directional coupler 124, and is terminated non-reflectively by a light-absorbing terminator 162. The directional coupler 124 is preferably constructed to couple approximately 50 percent of the light in one of the optical fibers to the other optical fiber. Accordingly, approximately 50 percent of the light propagating in the input end portion 120 of the first optical fiber 112 is coupled to the end portion 154 of the second optical fiber 150. The other 50 percent of the light exits the second port 132 of the first directional coupler 124 and propagates in the intermediate portion 140.

The intermediate portion 140 of the first optical fiber 112 provides an optical propagation path from the first directional coupler 124 to a second directional coupler 170 that may be constructed in a similar manner to the first directional coupler 124. The second directional coupler 170 has a first port 172, a second port 174, a third port 176, and a fourth port 178. The intermediate portion 140 of the first optical fiber 112 enters the second directional coupler 170 at the first port 172. After passing through the second directional coupler 170 between the first port 172 and the second port 174, the first optical fiber 112 forms the sensing loop 114, as discussed above. The first optical fiber 112 then passes back through the second directional coupler 170 from the fourth port 178 and the third port 176. A second end portion 180 of the first optical fiber 112 extends from the third port 176 and is terminated by a terminator 182 that comprises a light-absorbing material. The second directional coupler 170 is constructed to have substantially 50 percent coupling efficiency. When light is input to the second directional coupler 170 via the first port 172, the light will be split so that the light output from the second directional coupler 170 will be divided substantially equally between two the output ports 174 and 178. The light output from the second directional coupler 170 forms a first light wave, represented by an arrow $W_1$, that propagates around the sensing loop 114 in a clockwise direction, as viewed in FIG. 1, and a second light wave, represented by an arrow $W_2$, that propagates around the sensing loop 114 in a counter-clockwise direction. Thus, the second directional coupler 170 forms a pair of counterpropagating light waves that traverse the sensing loop 114. Since the coupling efficiency of the second directional coupler 170 is 50 percent, the intensities of the two light waves $W_1$ and $W_2$ are substantially equal.

After traversing the entire length of the first optical fiber 112 that forms the sensing loop 114, the first light wave W₁, enters the second directional coupler 170 via the fourth port 178, and the second light wave W₂ enters the second directional coupler 170 via the second port 174, such that the waves W₁ and W₂ are recombined. Approximately 50 percent of the recombined light exits the first port 172 for propagation to the intermediate portion 140 of the first optical fiber 112. The remaining 50 percent of the recombined light exits via the third port 176 to be absorbed by the light-absorbing terminator 182.

The recombined light waves propagate via the intermediate portion 140 of the first optical fiber 112 to the second port 132 of the first directional coupler 124. Approximately 50 percent of the recombined light waves that enter the second port 132 are coupled to the first end portion 152 of the second optical fiber 150 via the third port 134 and propagate to the photodetector 160. The photodetector 160 outputs an electrical signal that is proportional to the intensity of the optical output signal, and the electrical signal is processed by a processing circuit to produce a signal indicative of the rotation rate of the loop.

A polarizer 190 is advantageously formed on the intermediate portion 140 of the first optical fiber 112 between the first directional coupler 124 and the second directional coupler 170. The polarizer 190 may be constructed in accordance with U.S. Pat. No. 4,386,822, which is incorporated herein by reference. The polarizer 190 is positioned on the intermediate portion 140 of the first optical fiber 112 so that light of one polarization mode is permitted to pass through the intermediate portion 140 while the passage of light of an orthogonal polarization mode is prevented.

As set forth in U.S. Pat. No. 4,410,275, which is incorporated by reference herein, the purpose of the polarizer 190 is to ensure reciprocal operation of the rotation sensor of FIG. 1. Spurious non-reciprocal phase differences may occur in the sensor because the light travelling in each of the two polarization modes of a single mode fiber, such as the first optical fiber 112, travels at a different propagation velocity. Such a non-reciprocal phase difference is indistinguishable from a rotationally induced Sagnac phase difference, and is dependent on environmental factors, such as temperature and pressure. When the polarizer 190 is included, light passing through the polarizer 190 and into the sensing loop 114 via the second directional coupler 170 propagates in only a selected one of the two polarization modes. Furthermore, when the two counterpropagating light waves W₁ and W₂ are recombined to form the recombined optical signal, any light in the recombined optical signal that does not have the same polarization as the light applied to the sensing loop 114 is prevented from reaching the first directional coupler 124 and thus does not form part of the optical output signal that is detected by the photodetector 160. Accordingly, by passing the input light (i.e., the light input to the sensing loop 114) and the output light (i.e., the light output from the sensing loop 114) through the same polarizer 190, only a single optical path is utilized for propagating the light waves. Thus, non-reciprocity caused by the different propagation velocities of the two polarization modes is eliminated. In preferred embodiments, the single mode optical fiber 112 is a highly birefringent optical fiber having two well-defined polarization modes, and the polarizer is adjusted to select light propagating in one of the two polarization modes. If non-birefringent fiber is used, it may be preferable to include a pair of polarization controllers (not shown) to adjust the polarization of the input optical signal and the polarization of the light propagating in the sensing loop so that the polarization is aligned with the polarization axis of the polarizer 190, thereby reducing optical power loss in the polarizer 190.

As set forth in U.S. Pat. No. 4,529,312, which is incorporated by reference herein, reciprocity may also be achieved through the use of unpolarized light. It has been found that unpolarized light causes the non-reciprocal phase errors to cancel.

As further illustrated in FIG. 1, a phase modulator 192 is formed on the optical fiber 112 proximate to the fourth port 178 of the second directional coupler 170 between the fourth port 178 and the sensing portion 114. The phase modulator 192 is electrically connected to and driven by an electrical signal generator 194. The phase modulator 192 may comprise a PZT cylinder, around which a portion of the first optical fiber 112 is wrapped. The first optical fiber 112 is bonded to the PZT cylinder so that when the PZT cylinder expands radially in response to an electrical modulating signal from the signal generator 194, the portion of the first optical fiber bonded to the PZT cylinder stretches. Other embodiments of modulators, such as electro-optic modulators, can also be used.

Figure 2:
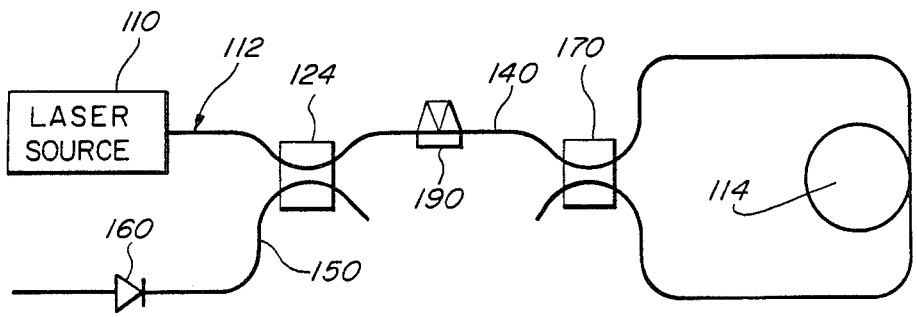
FIG. 2 is a schematic drawing of the interferometer of FIG. 1 with the phase modulator removed therefrom.

In order to understand the function of the phase modulator 192, the operation of the rotation sensor 100 will first be described as if the phase modulator 192 were not present. For the purposes of this discussion, the rotation sensor 100 is illustrated in FIG. 2 without the phase modulator 192. As set forth above, light from the source 110 traverses the sensing loop 114 and is combined to form an optical output signal that is detected by the photodetector 160.

The intensity of the optical output signal received by the photodetector 160 will vary in accordance with the amount and type (i.e., constructive or destructive) interference between the two counterpropagating light waves W₁ and W₂ when they are recombined at the second directional coupler 170. Assuming the sensing loop 114 is at rest (i.e., is not rotating), the two waves W₁ and W₂ travel the same optical path around the sensing loop 114. Thus, when the two waves W₁ and W₂ are recombined at the second directional coupler 170, they will interfere constructively, with no phase difference therebetween, and the intensity of the optical output signal detected by the photodetector 160 will be at a maximum. However, when the sensing loop 114 is rotated, the counterpropagating light waves W₁ and W₂ will be shifted in phase in accordance with the Sagnac effect, so that when they are superimposed at the second directional coupler 170, they destructively interfere, thereby causing a reduction in the intensity of the optical output signal and thus reducing the magnitude of the electrical output signal generated by the photodetector 160. The Sagnac phase difference between the light waves W₁ and W₂ is defined by the following relationship:

$$\Delta \Phi_R = \frac{8\pi NA}{\lambda c} Q \qquad (1)$$

where:

$\Delta \Phi_R$ is the Sagnac phase difference caused by rotation of the optical loop;

A is the area bounded by the optical loop in which the light waves counterpropagate;

N is the number of times that the light waves propagate around the loop before being recombined;

Q is the angular velocity of the loop about an axis that is perpendicular to the plane of the loop; and $\lambda$ and c are the free space values of the wavelength and velocity, respectively, of the light waves applied to the optical loop.

The intensity of the optical output signal is a function of the Sagnac phase difference $\Delta\Phi_R$ between the two counterpropagating light waves as follows:

$$I_T = I_1 + I_2 + 2\sqrt{I_1 I_2} \cos(\Delta\Phi_R) \quad (2)$$

where $I_T$ is the intensity of the optical output signal, and $I_1$ and $I_2$ are the individual intensities of the two counterpropagating light waves.

Figure 3:
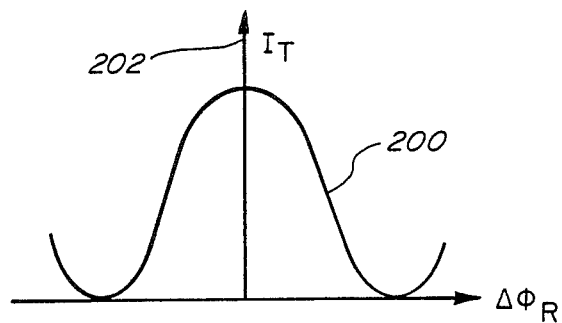
FIG. 3 is a graph of the intensity of the optical output signal, as measured by the photodetector, as a function of the rotationally-induced Sagnac phase difference.

From Equations 1 and 2, it may be seen that the intensity of the optical output signal is a function of the rotation rate Q. Thus, an indication of the rotation rate Q may be obtained by measuring the intensity of the optical output signal by using the photodetector 160. FIG. 3 shows a curve 200 that illustrates the relationship between the intensity $I_T$ of the optical output signal and the Sagnac phase difference $\Delta\Phi_R$ between the two counterpropagating light waves $W_1$ and $W_2$. The curve 200 has the shape of a cosine curve in accordance with Equation 2, and the intensity of the optical output signal is at a maximum when the Sagnac phase difference $\Delta\Phi_R$ is zero or an even multiple of $\pi$ (i.e., ... $-4\pi$, $-2\pi$, 0, $2\pi$, $4\pi$ ...) and at a minimum when the Sagnac phase difference $\Delta\Phi_R$ is a odd multiple of $\pi$ (i.e., ... $-3\pi$, $-\pi$, $\pi$, $3\pi$, $5\pi$ ...). When the phase difference between the counterpropagating waves is caused entirely by rotation of the sensing loop 114, the curve 200 will vary symmetrically about a vertical axis 202.

Referring to FIG. 3, it can be seen that, because the curve 200 is a cosine function, the intensity of the optical output signal detected by the photodetector 160 is highly nonlinear for small Sagnac phase differences $\Delta\Phi_R$ between the two counterpropagating light waves $W_1$ and $W_2$. Furthermore, the optical output signal intensity is relatively insensitive to changes in phase difference for small changes in the value of $\Delta\Phi_R$. Such nonlinearity and insensitivity makes it very difficult to transform the intensity $I_T$ of the optical output signal, as measured by the photodetector 160, into a signal that is indicative of the rate of rotation of the sensing loop 114 in accordance with Equations 1 and 2. For example, assuming that the horizontal axis of the FIG. 3 to the right of the vertical axis 202 represents Sagnac phase differences $\Delta\Phi_R$ caused by clockwise rotation of the sensing loop 114 and that the horizontal axis to the left of the vertical axis 202 represents Sagnac phase differences $\Delta\Phi_R$ caused by counterclockwise rotation of the sensing loop 114, it can be seen that the direction of rotation cannot be determined by simply measuring the intensity of the optical output signal since the intensity is symmetrical about the vertical axis 202 and is the same for equal rotation rates in either direction.

A number of devices and techniques have been used to measure the rotation rate by modulating the phases of the two counterpropagating light waves $W_1$ and $W_2$ such that the intensity of the optical output signal detected by the photodetector 160 includes sufficient information so that small rotation rates can be measured and so that rotation in the clockwise direction can be distinguished from rotation in the counterclockwise direction. For example, U.S. Pat. Nos. 4,410,275; 4,456,377; 4,529,312; 4,634,282; and 4,637,722; and U.S. patent application Ser. No. 488,111, entitled "FIBER OPTIC ROTATION SENSOR WITH EXTENDED DYNAMIC RANGE," filed on Apr. 25, 1983 (now U.S. Pat. No. 4,687,330, issued on Aug. 18, 1987); U.S. patent application Ser. No. 581,304, entitled "GATED FIBER OPTIC ROTATION SENSOR WITH EXTENDED DYNAMIC RANGE," filed on Feb. 17, 1984 (now U.S. Pat. No. 4,728,192, issued on Mar. 1, 1988); and U.S. patent application Ser. No. 581,303, entitled "GATED FIBER OPTIC ROTATION SENSOR WITH LINEARIZED SCALE FACTOR," filed on Feb. 17, 1984 (now U.S. Pat. No. 4,707,136, issued on Nov. 17, 1987), which are incorporated herein by reference, disclose devices and techniques for modulating the phase of the counterpropagating light waves in a sensing loop and for determining the rotation rate from the intensity of the optical output signal.

Figure 4:
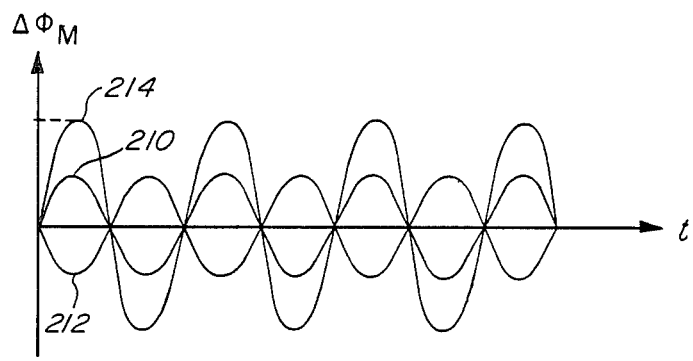
FIG. 4 is a graph of phase difference as a function of time, showing the phase modulation of each of the counterpropagating light waves and the phase difference between the counterpropagating light waves.

Referring to FIG. 4, the phase modulator 192 modulates the phase of each of the counterpropagating light waves $W_1$ and $W_2$ at the frequency of the signal generator 194. As set forth above, the phase modulator 192 is preferably located proximate to the second directional coupler 170, near one end of the sensing loop 114. Thus, the modulation of the clockwise propagating light wave $W_1$ is not necessarily in phase with the modulation of the counterclockwise propagating light wave $W_2$. In preferred embodiments of this invention, the modulation of the light wave $W_1$ is 180 degrees out of phase with the modulation of the light wave $W_2$. This is illustrated in FIG. 4, wherein the modulation of the phase of the light wave $W_1$ is represented by a sinusoidal curve 210 that is 180 degrees out of phase with a sinusoidal curve 212 that represents the modulation of the phase of the light wave $W_2$. Use of a modulation frequency that provides such 180-degree phase difference between the modulation of the light wave $W_1$ relative to that of the light wave $W_2$ is particularly advantageous because it eliminates the effects of modulator induced amplitude modulation in the optical output signal measured by the photodetector 160. The preferred modulation frequency $f_m$ that provides such 180-degree phase difference between the modulations of the two light waves may be calculated in accordance with the following equation:

$$f_m = \frac{c}{2n_{eq}L} \quad (3)$$

where:

L is the differential fiber length between the second directional coupler 170 and the phase modulator 192 for the counterpropagating light waves $W_1$ and $W_2$, i.e., the distance, measured along the fiber, between the phase modulator 192 and a symmetrical point on the opposite end of the sensing loop 114;

$n_{eq}$ is the equivalent refractive index for the single mode optical fiber 112; and c is the free space velocity of the light applied to the sensing loop 114.

At the selected modulation frequency $f_m$, which is often called the "proper frequency", the phase difference $\Delta\Phi_M$ between the two counterpropagating light waves $W_1$ and $W_2$ caused by the phase modulation of the two light waves is illustrated by a sinusoidal curve 214 in FIG. 4. The curve 214 is obtained by subtracting the curve 212 from the curve 210 to obtain the phase difference between the light wave $W_1$ and the light wave $W_2$. The modulation of the phase difference between the light wave $W_1$ and the light wave $W_2$ also modulates the intensity $I_T$ of the optical output signal in accordance with the curve 200 of FIG. 3. Such phase modulation $\Delta\Phi_M$ is indistinguishable from rotationally-induced Sagnac phase difference $\Delta\Phi_R$.

Figure 5:
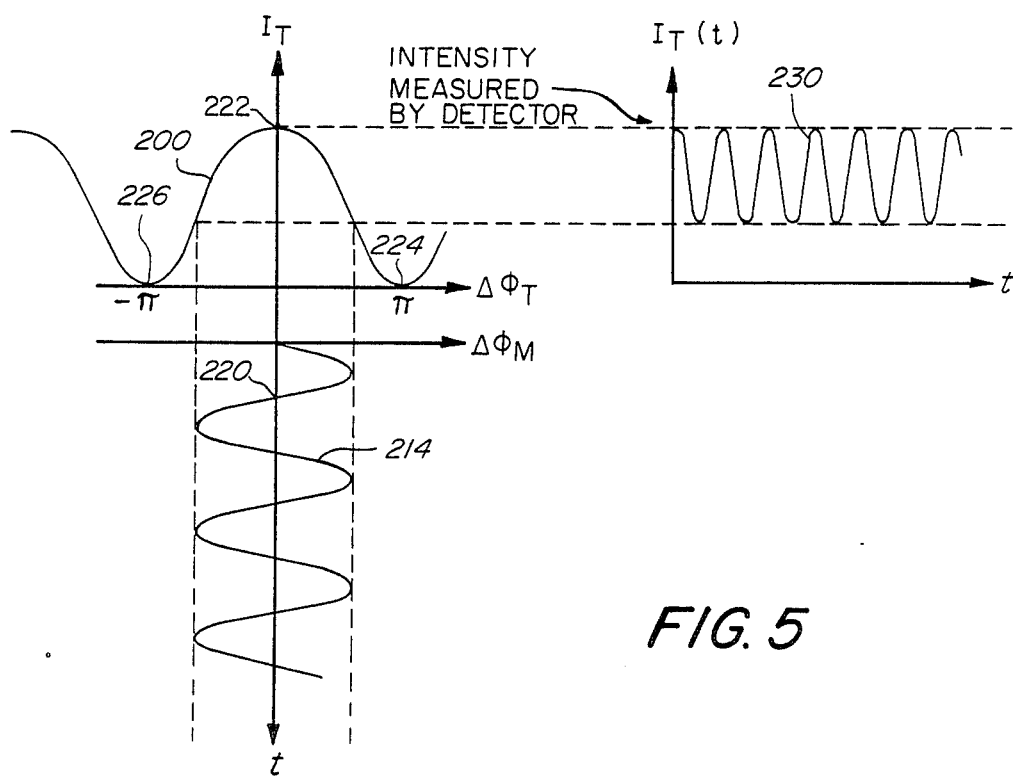
FIG. 5 is a schematic drawing illustrating the effect of the phase modulation upon the intensity of the optical output signal, as measured by the photodetector, when the sensing loop is not rotating.
Figure 6:
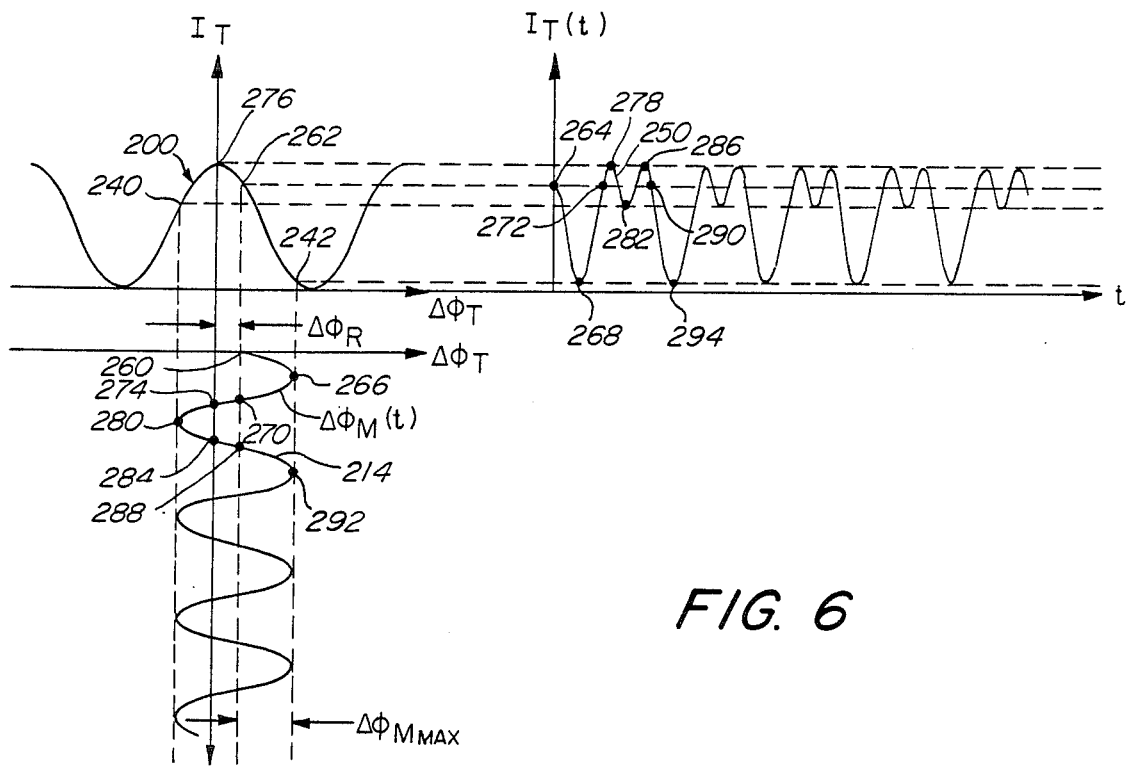
FIG. 6 is a schematic drawing showing the effect of the phase modulation upon the intensity of the optical output signal, as measured by the detector, when the sensing loop is rotating in a first direction.

The foregoing may be more fully understood by referring to FIGS. 5 and 6 which graphically illustrate the combined effect of the phase modulation $\Delta\Phi_M$, defined by the curve 214 of FIG. 4, and the rotationally-induced Sagnac phase difference $\Delta\Phi_R$, upon the intensity $I_T$ of the optical output signal. It should be understood that the intensity $I_T$ is a function of the total phase difference between the light waves $W_1$ and $W_2$, and that the total phase difference is comprised of both the rotationally-induced Sagnac phase difference $\Delta\Phi_R$ and the time-varying modulation-induced phase difference $\Delta\Phi_M$. The total phase difference $\Delta\Phi_T$ between the two light waves $W_1$ and $W_2$ may be expressed as follows:

$$\Delta\Phi_T = \Delta\Phi_R + \Delta\Phi_M \quad (4)$$

As indicated above, the effects of the modulation-induced phase difference $\Delta\Phi_M$, as well as the rotationally-induced phase difference $\Delta\Phi_R$, will be considered in reference to FIGS. 5 and 6. Accordingly, the horizontal axis for the graph of the curve 200 in FIGS. 5 and 6 has been labelled as $\Delta\Phi_T$ to indicate that the total phase difference is being considered, rather than only the rotationally-induced phase difference $\Delta\Phi_R$, as in FIG. 3.

Referring now to FIG. 5, the effect of the phase modulation $\Delta\Phi_M$ (represented by the curve 214) upon the intensity $I_T$ will be first discussed. The curve 200 represents the relationship between (1) the intensity of the optical output signal resulting from interference of the two waves $W_1$ and $W_2$ at the coupler 170, and (2) to the phase difference $\Delta\Phi_T$ between the two light waves at the coupler 170. When the modulation-induced phase difference $\Delta\Phi_M$ between the two light waves is zero, as illustrated at a location 220 on the curve 200 in FIG. 5, the resultant intensity $I_T$ of the combined light waves is a maximum, as illustrated at the location 222 on the curve 200. When the relative phase angle between the two light waves $W_1$ and $W_2$ is non-zero, the combined optical signal will have a lower intensity, depending upon the magnitude of the phase difference $\Delta\Phi_M$. The intensity continues to decrease with increasing $\Delta\Phi_M$ until the relative phase difference $\Delta\Phi_M$ is either plus or minus 180 degrees, as illustrated at a location 224 and at a location 226, respectively, in FIG. 5. At a phase difference of plus or minus 180 degrees (i.e., $+\pi$ or $-\pi$), the two counterpropagating light waves completely destructively interfere, and the resultant intensity is zero, as illustrated at the location 224 and the location 226. Since the curve 200 is a periodic function of the total phase difference $\Delta\Phi_T$, if the total phase difference $\Delta\Phi_T$ is increased beyond $+\pi$ or $-\pi$, the intensity will increase, as further illustrated in FIG. 5.

In FIG. 5, it is assumed that the sensing loop 114 is at rest, and thus, the optical output signal is not affected by the Sagnac effect. Specifically, it may be seen that the modulation-induced phase difference curve 214 causes the intensity $I_T$ of the optical output signal to vary in time, as illustrated by an intensity curve 230 in FIG. 5. The intensity curve 230 is obtained by translating the points on the curve 214 (representing the instantaneous modulation phase difference $\Delta\Phi_M$ between the two light waves $W_1$ and $W_2$) onto the curve 200 (representing the resultant optical intensity for a phase difference of that magnitude). When all the points on the curve 214 are translated onto the curve 200, and the corresponding intensities are plotted, the curve 230 results. At zero rotation, the translation of the curve 214 through the curve 200 is symmetrical about the vertical axis 202 of the curve 200. Thus, the optical intensity represented by the curve 230, and measured by the photodetector 160, varies periodically at a frequency equal to the second harmonic of the modulating frequency $f_m$.

When the sensing loop 114 is rotated, the counter-propagating light waves $W_1$ and $W_2$ are shifted in phase in accordance with the Sagnac effect, as discussed above. The Sagnac phase shift provides a constant phase difference $\Delta\Phi_R$ for a constant rotational velocity. The Sagnac phase shift adds to the phase difference $\Delta\Phi_M$ caused by the phase modulator 192 so that the entire curve 214 is translated in phase from the position shown in FIG. 5 by an amount equal to $\Delta\Phi_R$, as illustrated in FIG. 6. The addition of the rotationally-induced phase difference to the modulator-induced phase difference causes the intensity $I_T$ of the optical output signal to vary nonsymmetrically along the curve 200 between a point 240 and a point 242, and thus causes the optical output signal to have a time-varying intensity as illustrated by a curve 250 in FIG. 6.

The curve 250 can be obtained by translating points on the curve 214 onto the curve 200, as discussed above in connection with FIG. 5. For example, the combined phase difference $\Delta\Phi_T$, illustrated at a location 260 on the curve 214 translates through a location 262 on the curve 200 to a location 264 on the curve 250. It should be understood that the location 264 corresponds in time to the location 260 and corresponds in amplitude to the location 262. Similarly, a location 266 on the curve 214 translates through the location 242 on the curve 200 to a location 268 on the curve 250; a location 270 on the curve 214 translates through the location 262 on the curve 200 to a location 272 on the curve 250; a location 274 on the curve 214 translates through a location 276 on the curve 200 to a location 278 on the curve 250; a location 280 on the curve 214 translates through the location 240 on the curves 250 to a location 282 on the curve 250; a location 284 on the curve 215 translates through the location 276 on the curve 200 to a location 286 on the curve 250; a location 288 on the curve 214 translates through the location 262 on the curve 200 to a location 290 on the curve 250; and a location 292 on the curve 214 translates through the location 242 on the curve 200 to a location 294 on the curve 250. It can be seen that after the curve 214 completes one cycle, for example, from the location 260 to the location 288, and begins repeating, the corresponding locations on the curve 250 also repeat.

Figure 7:
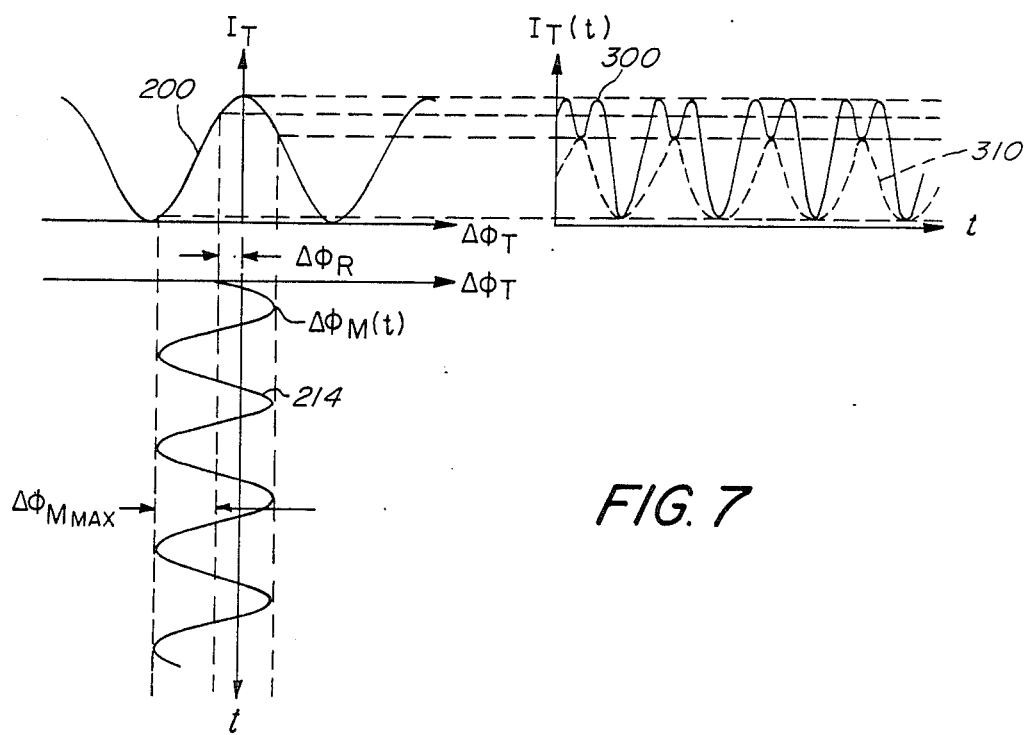
FIG. 7 is a schematic drawing showing the effect of the phase modulation upon the intensity of the optical output signal, as measured by the detector, when the sensing loop is rotating in a second direction, opposite the first direction.

FIG. 7 illustrates a curve 300 for the optical output signal when the phase difference $\Delta\Phi_R$ results from rotation in the opposite direction to the rotation in FIG. 6 and thus causes the curve 214 to be shifted in the opposite direction along the $\Delta\Phi_T$ axis. It can be seen that for substantially the same magnitude of Sagnac phase shift $\Delta\Phi_R$, the curve 300, representing the intensity of the optical output signal, is substantially similar to the curve 250 in FIG. 6; however, the curve 300 is shifted in phase with respect to the curve 250.

The optical output signal has a first harmonic component as illustrated by sinusoidal curve 310 (shown in phantom) in FIG. 7. The amplitude of this first harmonic component is indicative of the rotationally-induced Sagnac phase shift. Thus, by detecting this first harmonic, an indication of the rotation rate of the sensing loop 114 may be obtained. An example of a previous rotation sensor that utilizes this technique is disclosed in U.S. Pat. No. 4,410,275. Such rotation sensors typically used a lock-in amplifier to synchronously detect the component of the electrical representation of the optical output signal to provide an amplified output signal having a value proportional to the RMS value of the first harmonic component of the optical output signal. The amplified output signal is used in such rotation sensors to indicate the rotation rate of the sensing loop.

The present invention provides an apparatus and method for determining the direction and rate of rotation of the sensing loop 114 that does not require the use of a lock-in amplifier or other such device. The present invention is particularly advantageous in that it lends itself to digital processing of the optical output signal.

Figure 8:
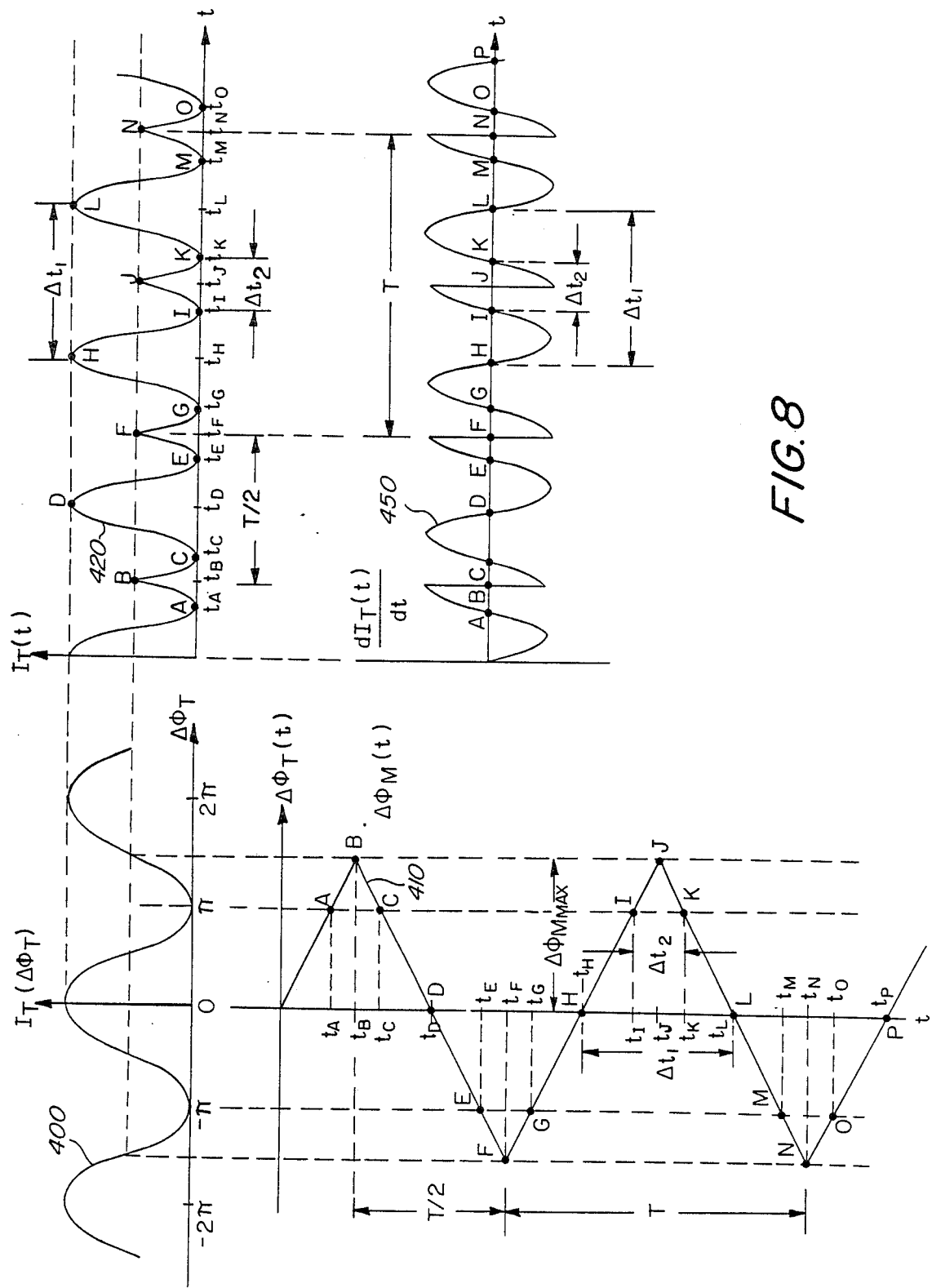
FIG. 8 is a schematic drawing similar to FIG. 5 illustrating the effect of a triangular phase modulation upon the intensity of the optical output signal, as measured by the photodetector, when the sensing loop is not rotating, and further illustrating an electrical waveform produced by differentiating the electrical output of the photodetector.

FIG. 8 illustrates a set of four curves. Three of the curves, 400, 410 and 420, are similar to the three curves 200, 214, and 300 discussed above in connection with FIG. 7. The curve 400 illustrates the output intensity $I_T$ as a function of the total differential phase shift $\Delta\Phi_T$ between the two counterpropagating light waves $W_1$ and $W_2$. As before, the curve 400 is cosinusoidal such that the maximum output intensity $I_T$ corresponds to zero phase shift and to even multiples of $\pi$ phase shift, and the minimum output intensity corresponds to odd multiples of $\pi$ phase shift. The curve 410 represents the time-varying differential modulation $\Delta\Phi_M(t)$ of the phase caused by the operation of the phase modulator 192 (FIG. 1). In FIG. 8, the curve 410 is illustrated as a triangular waveform; however, as will be shown below, other waveforms for the phase modulation (e.g., sinusoidal) can be alternatively used. In preferred embodiments, the modulation is symmetrical such that the increasing portion of the modulation on one side of a maximum (or a minimum) is mirrored by a corresponding decreasing portion on the other side of a maximum (or a minimum) in each half cycle, and such that the slopes of the increasing and decreasing portions are finite (i.e., have a well-defined, non-vertical slope). In FIG. 8, it is assumed that the sensing loop 114 is not rotating so that the time-varying total phase difference $\Delta\Phi_T(t)$ between the two light waves is the same as the differential phase modulation $\Delta\Phi_M(t)$. The time-varying phase difference $\Delta\Phi_T(t)$ translates through the curve 400 to a curve 420 that represents the intensity $I_T(t)$ of the optical output signal as a function of time. In FIG. 8, the amplitude of the phase modulation is selected so that the total phase difference $\Delta\Phi_T$ has an absolute magnitude that is greater than $\pi$ and less than $2\pi$. For example, in FIG. 8, the total phase difference $\Delta\Phi_T$ varies from a magnitude that is between $-2\pi$ and $-\pi$ to a magnitude that is between $+\pi$ and $+2\pi$. This selection of the amplitude of the phase modulation assures that the phase modulation curve 410 will have an excursion that passes the minima on the curve 400 at $-\pi$ and at $+\pi$.

The curve 420 has a number of distinct maxima and minima that correspond in time to the maxima and minima of the curve 410, as translated through the curve 400, and a number of distinct maxima and minima that correspond to the maxima and minima of the curve 400.

Each of the maxima and minima on the curve 410 and each of the locations on the curve 410 that corresponds to a maxima or a minima of the curve 400 has been labelled with a letter A, B, C, D . . . , O, P. The corresponding locations on the curve 420 have been labelled with the same letter so that the correspondence can be clearly understood. For example, at a time $t_A$, the differential phase modulation $\Delta\Phi_M$ has a magnitude that corresponds to a differential phase shift of $+\pi$ and thus cause the optical output signal to have an intensity substantially equal to zero, as illustrated by the zero magnitude of the curve 420 at the time $t_A$ (i.e., the location A on the curve 420). Similarly, at a time $t_B$, the differential phase modulation $\Delta\Phi_M$ has a maximum positive magnitude. This magnitude translates through the curve 400 to a location B on the curve 420 at the time $t_B$. It can be seen that the locations A, C, E, G, I, K, M, and O correspond to the translation of the like-identified locations on the curve 410 through the minima of the curve 400 at phase differences of $-\pi$ and $+\pi$; and the locations D, H, L, and P on the curve 420 correspond to the translation of the like-identified locations on the curve 410 through the maximum of the curve 400 at a phase difference of zero. The peaks of the curve 420 at the locations B, F, J, and N correspond to the translation of the like-identified peaks of the curve 410 through the curve 400. One can see that the peaks of the curve 420 at the locations B, F, J, and N will be always spaced apart in time by intervals that are equal to one-half the period of the selected modulation. For example, in FIG. 8, the period of the phase modulation is shown as T, and one-half the period of the modulation is shown as T/2. So long as the frequency of the phase modulation is held constant, the spacing between the peaks B, F, J, and N will be constant. On the other hand, as will be described below in connection with FIG. 9, the times at which the maxima and minima of the curve 420 at the locations A, C, D, E, G, H, I, K, L, M, O, and P occur depends upon whether or not the modulation curve 410 is offset by a rotationally-induced phase difference $\Delta\Phi_R$ caused by the Sagnac effect.

As set forth above, the amplitude $\Delta\Phi_{Mmax}$ of the curve 410 is selected to be at least $\pi$ so that the phase excursion of the modulation passes through the minima and maxima of the curve 400. Preferably, the amplitude $\Delta\Phi_{Mmax}$ is selected to be greater than $\pi$ so that the locations of zero slope on the curve 420 caused by the minima and maxima of the curve 400 (e.g., the locations A, C, D, E, G, H, I, K, L, M, O) are distinguishable from the locations of zero slope caused by the peaks of the curve 410 (e.g., the locations B, F, J, N).

Figure 9:
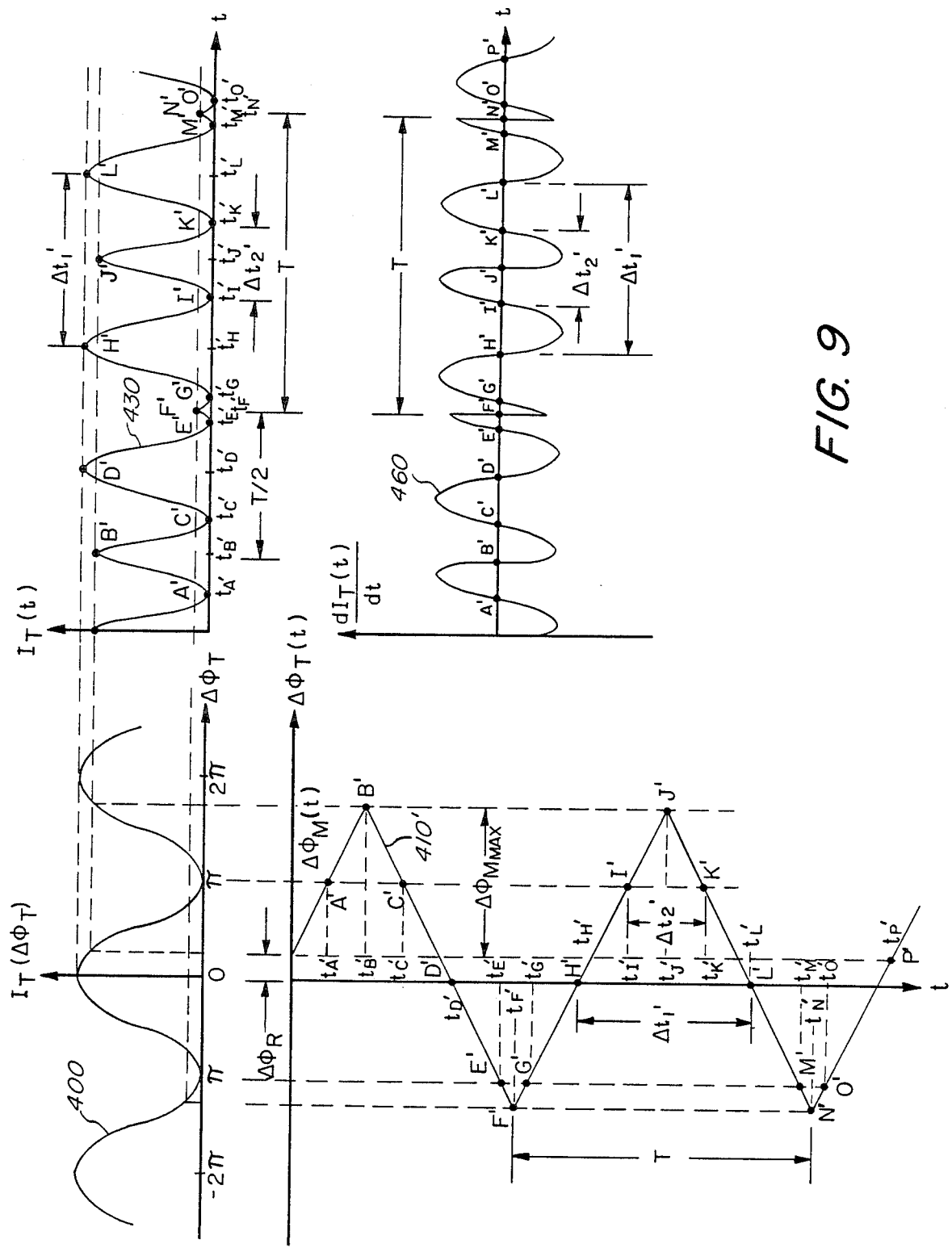
FIG. 9 is a schematic drawing similar to FIG. 8 illustrating the effect of a triangular phase modulation upon the intensity of the optical output signal, as measured by the photodetector, when the sensing loop is rotating, and further illustrating an electrical waveform produced by differentiating the electrical output of the photodetector.

FIG. 9 illustrates the curve 400 that corresponds to the curve 400 in FIG. 8, and also illustrates a curve 410' that generally corresponds to the curve 410 in FIG. 8. However, in FIG. 9, a rotationally-induced phase difference $\Delta\Phi_R$ has been added to the modulated phase difference curve 410 of FIG. 8 so that the modulated phase difference curve 410' is offset from the zero phase difference axis in the positive direction (i.e., towards $+\pi$). As in FIG. 8, the locations on the curve 410' in FIG. 9 are translated through the curve 400 to produce a curve 430 that represents the optical output intensity $I_T(t)$ as a function of time. For example, the relative peaks at the locations B', F', J', and N' on the curve 430 correspond to the maximum and minimum excursion of the curve 410' with respect to the curve 400. The magnitudes of the peaks at the locations B', F', J', and N' of the optical output intensity $I_T(t)$ curve 430 in FIG. 9 have changed with respect to the corresponding locations B, F, J, and N on the curve 420 in FIG. 8 since the maxima and minima of the curve 410' have shifted with respect to the differential phase shift axis $\Delta\Phi_T$ of the curve 400. However, the times at which the peaks at the locations B', F', J', and N' are fixed since they directly correspond to the times at which the like-identified maxima and minima of the curve 410 occur. In contrast, the magnitudes of the maxima and minima A and A', C and C', D and D', E and E', G and G', H and H', I and I', K and K', L and L', M and M', O and O', and P and P' are fixed, but the times at which they occur vary in accordance with the amount of Sagnac phase shift $\Delta\Phi_R$ that has been added to the phase modulation $\Delta\Phi_M$. For example, when FIG. 9 is compared with FIG. 8, it can be seen that in FIG. 9 the two locations H' and L' on the curve 410' that translate through the maximum of the curve 400 at 0 have shifted in time with respect to the locations H and L in FIG. 8. In particular, the locations H' and L' in FIG. 9 are spaced further apart in time by a time interval $\Delta t_1'$ that is greater than a corresponding time interval $\Delta t_1$ between the locations H and L in FIG. 8. Similarly, the locations I' and K' in FIG. 9 are spaced apart by a time interval $\Delta t_2'$ that is greater than a corresponding time interval $\Delta t_2$ between the locations I and K in FIG. 8.

The change in the time interval between the locations H and L and the locations H' and L' and the change in the time interval between the locations I and K and the locations I' and K' are directly related to the offset in the curve 410' relative to the curve 410 in FIG. 8 caused by the rotationally-induced Sagnac phase difference $\Delta\Phi_R$. This can be more fully understood by referring to FIG. 10 wherein the portion of the curve 410 in FIG. 8 between the locations H and L is expanded for clarity, and to FIG. 11 wherein the portion of the curve 410' between the locations H' and L' is expanded for clarity.

Figure 10:
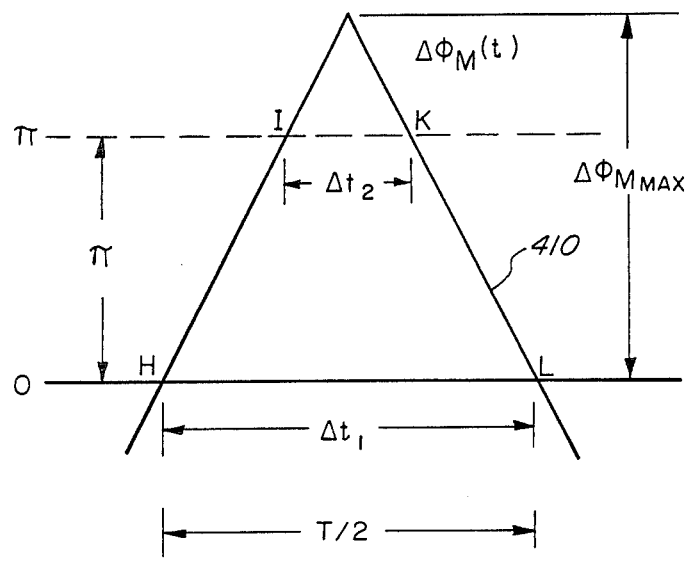
FIG. 10 is a schematic drawing of an enlarged portion of the triangular modulation waveform of FIG. 8.
Figure 11:
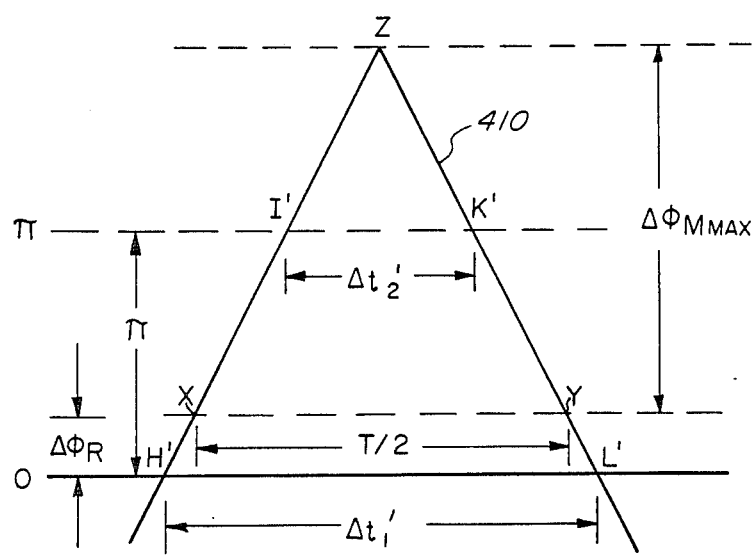
FIG. 11 is a schematic drawing of an enlarged portion of the triangular modulation waveform of FIG. 9.

Referring first to FIG. 10, which represents the curve 410 when there is no additional phase shift $\Delta\Phi_R$ caused by rotation, it can be seen that the magnitudes of the time intervals $\Delta t_1$ and $\Delta t_2$ can be determined by geometric calculations based upon the maximum amplitude of the phase modulation $\Delta\Phi_M(t)$, shown as $\Delta\Phi_{Mmax}$. As was illustrated in FIG. 8, and as shown again in FIG. 10, the magnitude of the time interval between the location H and the location L is $\Delta t_1$ and the time interval between the location I and the location K is $\Delta t_2$. In FIG. 10, the locations H and L represent a phase differences of zero and correspond to the maxima on the optical output intensity curve 420 in FIG. 8. The locations I and K represent a phase difference of $\pi$ and correspond to the minima on the optical output intensity curve 420 in FIG. 8. Thus, the locations H and L are always separated from the locations I and K by a phase difference of $\pi$ radians. This is further illustrated in FIG. 11 wherein the locations I' and K' are shown as being separated from the locations H' and L' by phase angle difference of $\pi$ radians. However, in FIG. 11, the time interval $\Delta t_1$, between the location H' and the location L' is larger than the time interval $\Delta t_1$ between the location H and the location L in FIG. 10. Similarly, the time interval $\Delta t_2'$ between the location I' and the location K' in FIG. 11 is greater than the time interval $\Delta t_2$ between the location I and the location K in FIG. 10. The change in the time difference is directly related to the offset in the phase difference caused by the rotationally induced phase difference $\Delta\Phi_R$.

The relationship between the rotation-induced phase difference $\Delta\Phi_R$ and the points H', L', I', and K' in FIG. 11 may be analyzed using geometry. A first triangle is formed by points X, Y, and Z of the curve 410. The points X and Y are the points of the curve 410 which are displaced from zero phase difference by the $\Delta\Phi_R$ effect. A second triangle is formed by points H', L', and Z. Finally, a third triangle is formed by points I', K', and Z. The first triangle has a base of T/2 and has a height of $\Delta\Phi_{Mmax}$, which is one-half of the peak-to-peak phase excursion caused by the phase modulator. The second triangle has a base of $\Delta t_1'$ and a height of $(\Delta\Phi_{Mmax}+\Delta\Phi_R)$. The third triangle has a base of $\Delta t_2'$ and a height of $(\Delta\Phi_{Mmax}+\Delta\Phi_R-\pi)$. Thus, it follows that:

$$(T/2)/\Delta\Phi_{Mmax}=\Delta t_1'/(\Delta\Phi_{Mmax}+\Delta\Phi_R) \quad (5)$$

and $$(T/2)/\Delta\Phi_{Mmax}=\Delta t_2'/(\Delta\Phi_{Mmax}+\Delta\Phi_R-\pi) \quad (6)$$

Both Equations 5 and 6 can be rearranged to obtain the following:

$$(\Delta\Phi_R/\Delta\Phi_{Mmax})=(2\Delta t_1'-T)/T=\delta_1 \quad (7)$$

and $$((\Delta\Phi_R-\pi)/\Delta\Phi_{Mmax})=(2\Delta t_2'-T)/T=\delta_2 \quad (8)$$

where $\delta_1$ and $\delta_2$ are selected to represent the two equalities in Equations 7 and 8, respectively. When the maximum modulation-induced phase difference $\Delta\Phi_{Mmax}$ is held constant, then it follows that the difference between $\delta_1$ and $\delta_2$ is a constant as follows:

$$\begin{aligned}\delta_1-\delta_2 &= (\Delta\Phi_R/\Delta\phi_{Mmax})-((\Delta\Phi_R-\pi)/\Delta\Phi_{Mmax}) \\ &= \pi/\Delta\Phi_{Mmax} = \text{constant}\end{aligned} \quad (9)$$

If the phase excursion $\Delta\Phi_{Mmax}$ caused by the phase modulator 192 is preselected such that it is a known value, the value of the constant can be calculated directly from Equation 9. If this phase excursion $\Delta\Phi_{Mmax}$ is not known in advance, $\delta_1$ and $\delta_2$ can be determined by measuring the time intervals $\Delta t_1'$ and $\Delta t_2'$, and the constant can be calculated using Equations 7, 8, and 9. Furthermore, once the constant is determined, then the maximum modulation-induced phase difference $\Delta\Phi_{Mmax}$ can be determined by dividing the constant by $\pi$. After the maximum modulation-induced phase difference $\Delta\Phi_{Mmax}$ is calculated, then the rotationally-induced phase difference $\Delta\Phi_R$ can be determined by using either of Equations 7 and 8 as follows:

$$\Delta\Phi_R=\delta_1\times\Delta\Phi_{Mmax}=\Delta\Phi_{Mmax}\times(2\Delta t_1'-T)/T \quad (10)$$

and $$\Delta\Phi_R=(\delta_2\times\Delta\Phi_{Mmax})+\pi=(\Delta\Phi_{Mmax}\times(2\Delta t_2'-T)/T)+\pi \quad (11)$$

Referring back to FIG. 9, it can be seen that the time interval $\Delta t_1'$ can be measured by detecting the two peaks at the locations H' and L' and measuring the time interval between the occurrences of the two peaks. The two peaks are distinguishable from the peak at the location J' both because the two peaks H' and L' are larger than the peak at J' and also because they do not coincide with a maximum of the time-varying modulation $\Delta\Phi_M(t)$. Similarly, the time interval $\Delta t_2'$ can be measured by detecting the two minima at the locations I' and K'. The two minima at I' and K' are distinguishable from the minima at the location G' because the minima at the locations I' and K' are adjacent in time to the maximum in the time-varying modulation $\Delta\Phi_M(t)$ at the location J'. Thus, the electrical signal from the electrical signal generator 194 can be advantageously used to synchronize circuitry, to be described below, that detects the maxima at the locations H' and L' and the minima at the locations I' and K'.

Before describing the preferred embodiment of the detection signal, reference is again made to FIGS. 8 and 9. As set forth above, the time intervals $\Delta t_1$ and $\Delta t_2$ (and $\Delta t_1'$ and $\Delta t_2'$) are measured by detecting the maxima and minima in the optical output signal represented by the curve 420 (FIG. 8) and the curve 430 (FIG. 9). Although the maxima and minima can be detected by direct measurement, such direct measurements may be difficult to accomplish using digital techniques. Thus, in preferred embodiments of the present invention, the electrical representation of the time-varying optical output signal is not measured directly. Rather, the electrical representation of the optical output signal is differentiated to provide a differentiated output signal $d[I_T(t)]/dt$ that is illustrated by a curve 450 in FIG. 8 and a curve 460 in FIG. 9. As illustrated by the curves 450 and 460, the relative maxima and minima of curves 420 and 430 correspond to zero-crossings of the curves, 450 and 460, respectively. For example, the maximum at the location H of the curve 420 of FIG. 8 corresponds to a zero-crossing at a corresponding location H on the curve 450. Since the location H on the curve 420 is a maximum, the zero crossing at the corresponding location H on the curve 450 is shown as a transition from a positive value to a negative value. Similarly, a negative-to-positive going zero-crossing at a location I on the curve 450 in FIG. 8 corresponds to a minimum at the location I on the curve $I_T(t)$ 420 in FIG. 8. In many cases, it is easier to construct a circuit that precisely detects the zero-crossings of the differentiated signal $d[I_T(t)]/dt$ than it is to construct a circuit that precisely detects the relative maxima and minima of the signal $I_T(t)$. The preferred embodiments of the present invention measure the time intervals $\Delta t_1'$ and $\Delta t_2'$ by measuring the time between he zero-crossings of the differentiated output signal $d[I_T(t)]/dt$.

Figure 12:
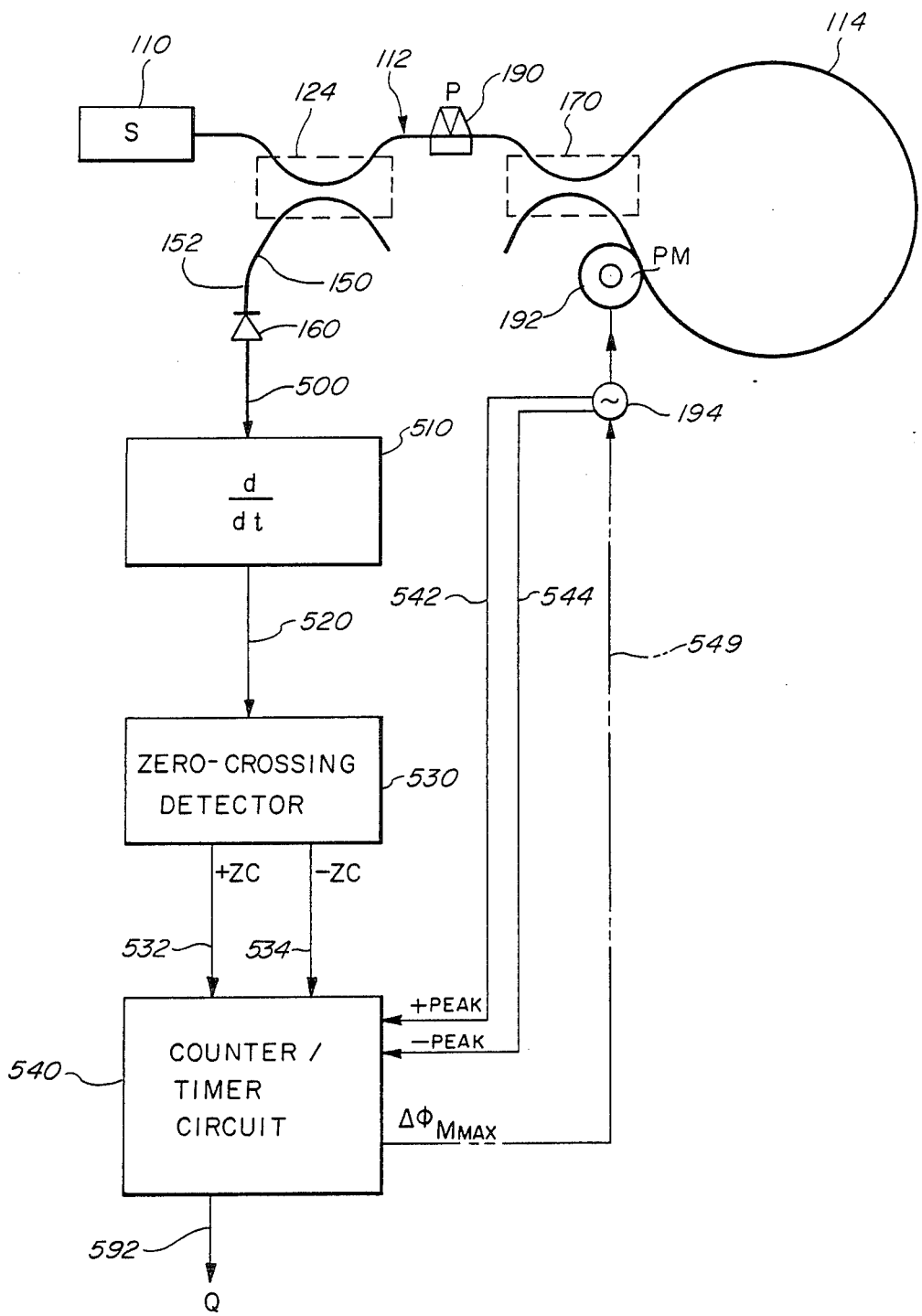
FIG. 12 is a block diagram of an exemplary embodiment of the apparatus of the present invention showing the rotation sensor, the photodetector, the electrical differentiating circuit connected to the electrical output of the photodetector, the zero-crossing detector, and the counter/timer circuit.

A preferred embodiment of a rotation sensor constructed in accordance with the present invention is illustrated in FIG. 12. The elements of the optical elements of the rotation sensor correspond to the elements described above in connection with FIG. 1. The optical output signal from the first end portion 152 of the second optical fiber 150 is detected by the photodetector 160, and the photodetector 160 generates an electrical output signal on a line 500 that has a magnitude that is proportional to the time-varying intensity of the optical output signal detected by the photodetector 160. Thus, the electrical output signal has a time-varying magnitude that corresponds to the $I_T(t)$ curve 420 of FIG. 8, the $I_T(t)$ curve 430 of FIG. 9, or a similar curve having maxima and minima that occur at times that vary in accordance with the magnitude and direction of the rotation of the sensing loop 114.

The electrical output signal on the line 500 is provided as an input to a differentiating circuit 510 that receives the electrical output signal and generates a differentiated output signal $d[I_T(t)]/dt$ on a line 520 that corresponds to the $d[I_T(t)]/dt$ curve 450 of FIG. 8, the $d[I_T(t)]/dt$ curve 460 of FIG. 9, or another similar curve having zero-crossings that occur in time in accordance with the magnitude and direction of the rotation of the sensing loop 114. The differentiated output signal on the line 520 is provided as an input to a zero-crossing detection circuit 530. The zero-crossing detection circuit provides a positive zero-crossing output +ZC on a line 532 that is activated when the differentiated output signal crosses through zero magnitude from a negative value to a positive value; and provides a negative zero-crossing output −ZC on a line 534 that is activated when the differentiated output signal crosses through zero magnitude from a positive value to a negative value.

The positive zero-crossing signal +ZC and the negative zero-crossing signal −ZC on the lines 532 and 534, respectively, are provided as inputs to a counter/timer circuit 540. The counter/timer circuit 540 also receives a pair of synchronization input signals on a line 542 and a line 544 from the signal generator 194. The synchronization input signal on the line 542 synchronizes the counter/timer circuit 540 with the positive peaks of the electrical modulation signal output of the signal generator 194 and thus correspond to the locations B and J on the $\Delta\Phi_M(t)$ curve 410 in FIG. 8 and the locations B' and J' on the $\Delta\Phi_M(t)$ curve 410' in FIG. 9. The synchronization input signal on the line 544 synchronizes the counter/timer circuit 540 with the negative peaks of the electrical modulation signal output of the signal generator 194 and thus correspond to the locations F and N on the $\Delta\Phi_M(t)$ curve 410 in FIG. 8 and the locations F' and N' on the $\Delta\Phi_M(t)$ curve 410' in FIG. 9. The counter/timer circuit 540 is responsive to the synchronization signals on the lines 542 and 544 so that the counter/timer circuit 540 measures the time intervals between the zero-crossing signals corresponding to the locations H and H', I and I', K and K', and L and L', on the curves 450 and 460 in FIGS. 8 and 9, respectively, rather than measuring the time intervals that start or stop at the zero-crossings at the locations B and B', F and F', J and J', and N and N'.

Figure 13:
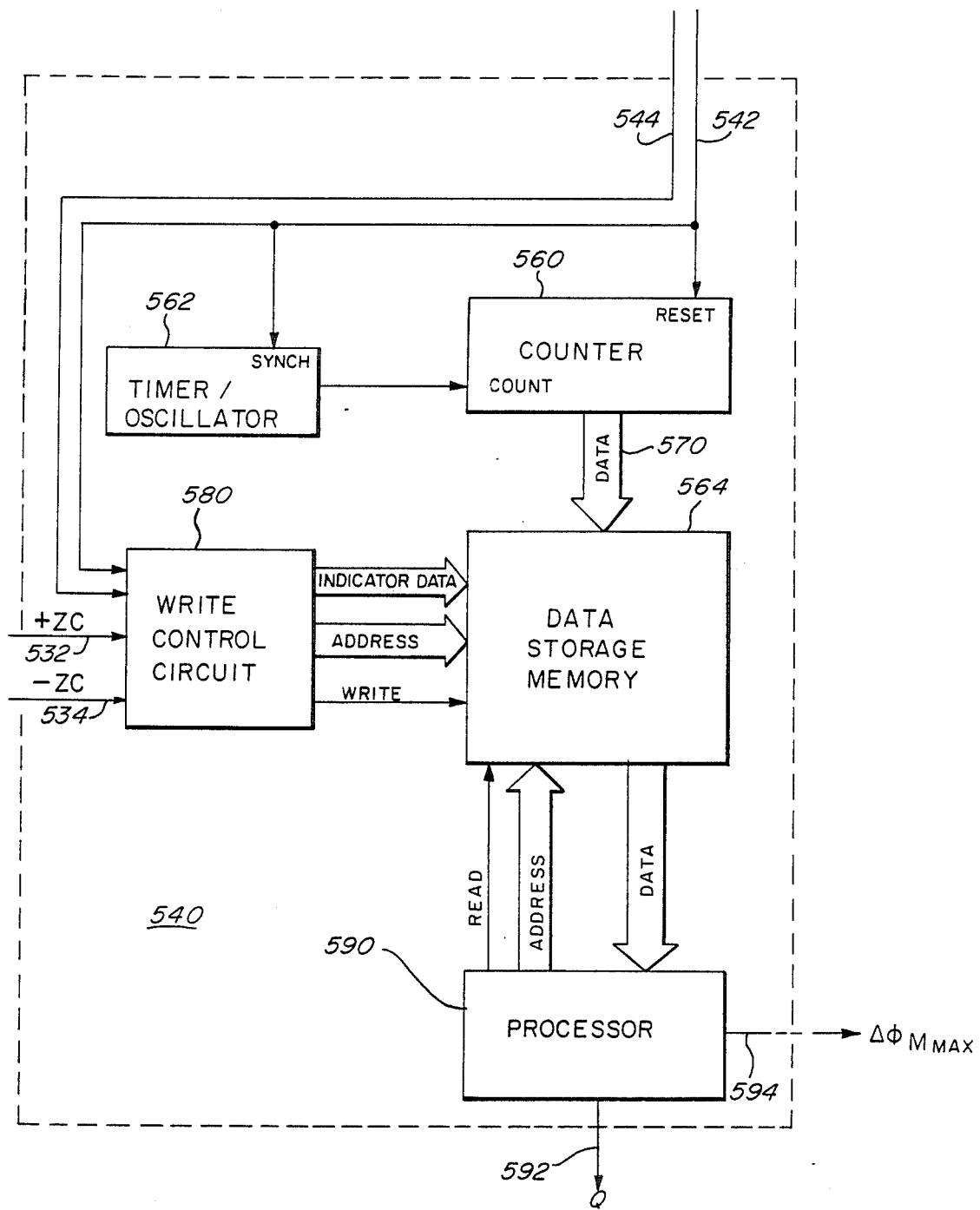
FIG. 13 is a block diagram of an exemplary embodiment of the counter/time circuit of FIG. 12.

An exemplary counter/timer circuit 540 is illustrated in FIG. 13. The counter/timer circuit 540 includes a counter 560, a timer/oscillator 562, and a data storage memory 564. The counter 560 is preferably a precision counter that is reset by one of the synchronization signals on the line 542 or the line 544 (e.g., the line 542, as illustrated in FIG. 12). The counter 560 counts in response to the output of the timer/oscillator 562.

The counter 560 provides a digital output on a bus 570 that represents the number of cycles of the output of the timer/oscillator 562 that have occurred since the counter 560 was most recently reset by the synchronization signal on the line 542 or 544. The digital output of the counter 560 is provided as a data input to the data storage memory 564. The data storage memory 564 has a plurality of data locations into which the data from the counter 560 are stored. The storage of data into the data storage memory 564 is controlled by a write control circuit 580 that is synchronized with the two synchronization signals on the lines 542 and 544 and with the zero-crossing signals +ZC and −ZC on the lines 532 and 534, respectively. Whenever the write control circuit 580 receives a zero-crossing signal +ZC or −ZC, it initiates a memory write cycle to the data storage memory 564 and stores the current digital output of the counter 560 on the bus 570 into a selected location of the data storage memory 564 along with an indicator that indicates whether the data corresponds to a positive-going zero-crossing signal from the +ZC line 532 or a negative-going zero-crossing signal from the −ZC line 534. Thus, the time of occurrence of each of the zero-crossings is stored in the data storage memory 564. Preferably, the write control circuit 580 also stores the current digital output of the counter 560 in the data storage memory 564 whenever each of the synchronization signals occurs along with an indicator that indicates that the count corresponds to the particular synchronization signal.

The data storage memory 564 is also addressable by a processor 590 which is advantageously a microprocessor. The processor 590 reads the data stored in the data storage memory 564 and calculates the time intervals between selected zero-crossing signals and calculates the magnitude of the rotationally-induced phase difference $\Delta\Phi_R$ in accordance with Equations 10 and 11, above. Thereafter, the angular velocity of rotation Q of the sensing loop 114 is calculated in accordance with Equation 1, above. It should be understood that the present invention is able to provide the above-described calculations without requiring a predetermined amplitude or frequency for the modulation signal provided by the signal generator 194. As was illustrated above in connection with Equation 9, the maximum amplitude $\Delta\Phi_{Mmax}$ of the phase modulation $\Delta\Phi_T(t)$ is calculated from the measured time intervals. Thus, it is not necessary to provide this maximum amplitude as an input to the processor 590 for the calculations. Furthermore, in the event that the maximum amplitude $\Delta\Phi_{Mmax}$ drifts from steady-state as the system operates, such as may occur if the signal generator varies in voltage or if the modulation is subject to temperature variations, the changes in the amplitude $\Delta\Phi_{Mmax}$ are automatically incorporated into the calculations described above. The calculated amplitude $\Delta\Phi_{Mmax}$ can also be provided as an output by the processor 590 to provide feedback to the signal generator 194 so that the amplitude of the signal generator output 194 is adjusted to maintain the amplitude within a selected range. By way of example, the amplitude $\Delta\Phi_{Mmax}$ may be maintained within the range of $\pi$ to $+2\pi$. This feedback is illustrated by a phantom line 594 from the counter/timer circuit 540 to the signal generator 194. The signal generator 194 can advantageously be a conventional signal generator that includes an error comparator circuit that automatically adjusts the amplitude of the signal generator output to the phase modulator 192 in response to variations in the calculated amplitude of $\Delta\Phi_{Mmax}$.

As set forth above, the write control circuit 580 preferably causes the counts associated with the zero-crossings caused by the maxima and minima of the phase modulation signal to be stored in the data storage memory 564. Thus, the time intervals T and T/2 can also advantageously be calculated by the processor 590. Therefore, it is not necessary to provide the time interval as an input to the processor 590. Once the processor 590 has calculated the rotationally-induced phase difference $\Delta\Phi_R$, the rotation rate Q is calculated using Equation 1, above, and the rotation rate provided as an output signal on a line 592 to be displayed or to be used to control other equipment (not shown).

It can thus be seen that the present invention provides an open loop rotation sensing system that is substantially independent of the system parameters (e.g., the modulation frequency and amplitude) that may change with time.

Figure 14:
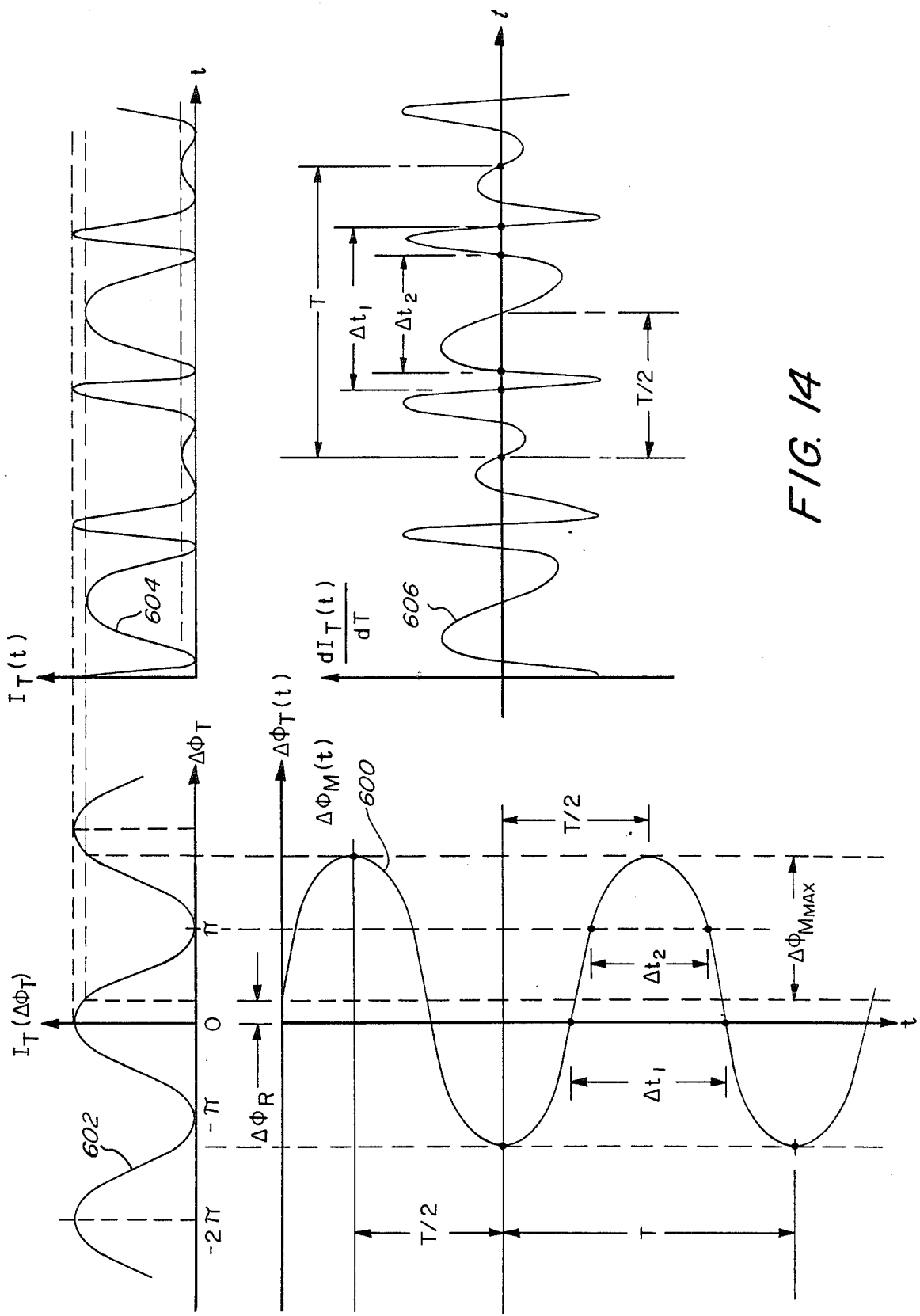
FIG. 14 is a schematic drawing similar to FIG. 9 illustrating the effect of a sinusoidal phase modulation upon the intensity of the optical output signal, as measured by the photodetector, when the sensing loop is rotating, and further illustrating an electrical waveform produced by differentiating the electrical output of the photodetector.

Although described above in connection with a triangular wave, it should be understood that other waveforms may be advantageously used. For example, FIG. 14 is similar to FIG. 9, but with a sinusoidal waveform, illustrated by a curve 600, substituted for the triangular waveform represented by the curve 410' of FIG. 9. As illustrated in FIG. 14, the sinusoidal curve 600 is offset by a rotationally-induced phase difference $\Delta\Phi_R$. The curve 600 is translated through a cosinusoidal curve 602 that illustrates the optical output intensity $I_T$ as a function of total phase difference $\Delta\Phi_T$ and that corresponds to the curve 400 in FIG. 9. As before, the optical output signal as a function of time (i.e., $I_T(t)$) is provided and is represented by a curve 604. The optical output signal is differentiated to provide a differentiated output signal $d[I_T(t)]/dt$, represented by a curve 606. The curve 606 has zero-crossings that correspond to the maxima and minima of the curve 604.

As in FIGS. 8 and 9, the time intervals between the maxima and minima of the optical output signal intensity curve 604 and the zero-crossings of the differentiated output signal curve 606 can be measured by electronic circuitry, as discussed in reference to FIG. 13. The measured time intervals are used to calculate the rotationally-induced phase difference $\Delta\Phi_R$. This is illustrated in FIG. 15, which is an expanded illustration of a portion of the phase modulation curve 600 of FIG. 14.

Figure 15:
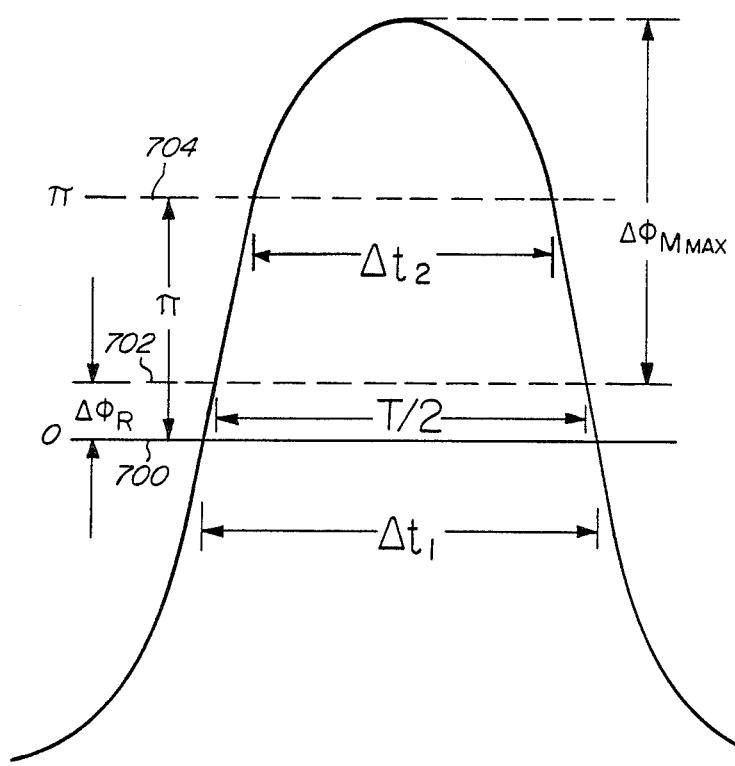
FIG. 15 is a schematic drawing of an enlarged portion of the sinusoidal modulation waveform of FIG. 14.

In FIG. 15, a solid line 700 represents the solid line in FIG. 14 corresponding to zero total phase difference (i.e., $\Delta\Phi_T(t)=0$), and a dashed line 702 represents the offset of the time-varying modulation $\Delta\Phi_M(t)$ by the rotationally-induced phase difference $\Delta\Phi_R$. A dashed line 704 represents a total phase difference $\Delta\Phi_T(t)$ of $\pi$ when the optical output intensity $I_T(t)$ is zero. The distance from the line 702 to the line 704 is equal to $\pi - \Delta\Phi_R$ and is directly related to the measurable time interval $\Delta t_2$ as follows:

$$(\pi - \Delta\Phi_R) = \Delta\Phi_{Mmax}\{\sin\,[(\pi/2)(T - 2\Delta t_2)/T]\} \qquad (12)$$

Similarly, the distance from the line 700 to the line 702 is equal to $\Delta\Phi_R$ and is directly related to the measurable time interval $\Delta t_1$ as follows:

$$\Delta\Phi_R = \Delta\Phi_{Mmax}\{\sin\,[(\pi/2)(2\Delta t_1 - T)/T]\} \qquad (13)$$

The two constants $\delta_1$ and $\delta_2$ can be defined for sinusoidal modulation as follows:

$$\delta_1 = (2\Delta t_1 - T)/T = (2/\pi)\sin^{-1}\,(\Delta\Phi_R/\Delta\Phi_{Mmax}) \qquad (14)$$

$$\delta_2 = (2\Delta t_2 - T)/T = (2/\pi)\sin^{-1}\,[(\Delta\Phi_R - \pi)/\Delta\Phi_{Mmax}) \qquad (15)$$

Thus:

$$\sin\,((\pi/2)\delta_1) = \Delta\Phi_R/\Delta\Phi_{Mmax} \qquad (16)$$

and $$\sin\,((\pi/2)\delta_2) = (\Delta\Phi_R - \pi)/\Delta\Phi_{Mmax} \qquad (17)$$

The modulation amplitude can be determined as follows:

$$\sin\,((\pi/2)\delta_1) - \sin\,((\pi/2)\delta_2) = \pi/\Delta\Phi_{Mmax} \qquad (18)$$

It can therefore be seen that the rotationally-induced phase difference $\Delta\Phi_R$ can be determined by measuring the time intervals between zero crossings and performing the calculations in accordance with Equations 14–18, above. The amplitude of the time-varying phase modulation can also be calculated in accordance with Equations 14–18.

Although the invention has been described in the context of a Sagnac interferometer for use as a rotation sensor, those skilled in the art will understand that the invention may be utilized in other types of interferometers for sensing ambient effects other than rotation. For example, the invention may be implemented in Mach-Zehnder interferometers, Michelson interferometers, Fabray-Perot interferometers (see, e.g., U.S. Pat. No. 4,469,397), or the like. Further, while the invention has been described in terms of a digital implementation, those skilled in the art will recognize that the invention may be implemented alternatively utilizing analog components.

What is claimed is:

1. An interferometric sensor for sensing an ambient effect, comprising:
    an interferometer having first and second optical paths, at least one of said optical paths configured for exposure to said ambient effect, said interferometer including a coupling device which couples said optical paths such that first and second light waves propagating in said optical paths interfere at said coupling device to form an optical output signal, said output signal having a waveform defined by phase differences between said light waves;
    a modulator coupled to at least said first optical path that modulates the phase of light propagating therethrough to cause a time varying phase difference between said first and second light waves at said coupling device, said waveform including first and second predetermined points spaced in time and having a time domain separation therebetween which is responsive to said ambient effect; and
    said interferometer further including a signal processing circuit and a photodetector, said signal processing circuit detecting the time domain separation between said first and second points to sense said ambient effect.

2. The sensor as defined in claim 1, wherein said optical paths are formed by a loop of fiber in which said light waves counterpropagate.

3. The sensor as defined in claim 1, wherein said predetermined points correspond to points of zero slope of said waveform.

4. The sensor as defined in claim 3, wherein one of said points corresponds to a first maximum of said waveform, and the other of said points corresponds to a second maximum of said waveform.

5. The sensor as defined in claim 1, wherein said processing circuit comprises:
    a differentiator that differentiates said waveform to provide a differentiated waveform, said two predetermined points corresponding to zero-crossings of said differentiated waveform;
    a zero-crossing detector that detects the zero crossings corresponding to said predetermined points; and
    a circuit that measures the time domain separation between said zero crossings.

6. The sensor as defined in claim 5, wherein:
    said waveform includes third and fourth predetermined points;
    said first circuit measures the time domain separation between said third and fourth points; and
    said processing circuit further comprises a comparator that compares the time domain separation of said first and second points with the time domain separation between said third and fourth points to dynamically measure changes in the phase excursion of said modulator.

7. The sensor as defined in claim 1, wherein said modulator has a phase excursion of at least $2\pi$ radians.

8. The sensor as defined in claim 1, wherein said modulator has a phase excursion of no more than $4\pi$ radians.

9. The sensor as defined in claim 1, wherein the modulator has a phase excursion which is from a value between $\pi$ and $2\pi$ radians to a value between $-\pi$ and $-2\pi$ radians.

10. The sensor as defined in claim 1, wherein the modulation is in accordance with a sinusoidal waveform.

11. The sensor as defined in claim 1, wherein the modulation is in accordance with a triangular waveform.

12. The sensor as defined in claim 1, wherein said ambient effect is a rotationally induced Sagnac effect.

13. The sensor as defined in claim 1, wherein said signal processing circuit comprises digital electronics.

14. An apparatus for sensing an ambient effect, comprising:
    an optical interferometer having first and second optical paths for propagating first and second light waves;
    a modulator that modulates the phase of at least one of said first and second light waves at a fixed frequency to cause a time-varying phase difference between the first and second light waves, said light waves further having a phase difference that is responsive to the ambient effect;
    a coupling device that combines said first and second light waves to provide an optical output signal having an intensity that varies in accordance with the combined effect of said time-varying phase difference caused by said modulator and said phase difference caused by ambient effect, said intensity having maxima and minima that are spaced apart in time, the spacing of said maxima and minima varying in response to said phase difference caused by the ambient effect;
    a photodetector that detects said intensity of said optical output signal and that provides an electrical output signal that varies in accordance with said intensity of said optical output signal and that has electrical maxima and minima that define locations of zero slope and correspond to said maxima and minima of said optical output signal; and
    an electrical circuit that measures the time between occurrences of at least two of said locations of zero slope in said electrical output signal and that generates an output signal that is calculated from said measured time.

15. The apparatus as defined in claim 14, wherein said electrical circuit comprises a computer.

16. The apparatus as defined in claim 14, wherein said electrical circuit includes a differentiator that differentiates said electrical output signal to provide a differentiated signal that has a magnitude that is substantially equal to zero at times corresponding to each of said maxima and minima of said electrical output signal, said electrical circuit further including means for measuring a time interval between two of said times at which said differentiated signal is substantially equal to zero.

17. The apparatus as defined in claim 16, wherein said ambient effect comprises rotation, and said electrical circuit further includes a computer that receives said measured time interval between said two of said times at which said differentiated signal is substantially equal to zero and that calculates a rotation rate that corresponds to said measured time interval.

18. The apparatus as defined in claim 14, further including a modulation signal source that provides a modulation signal that drives said modulators, said modulation signal having a time-varying amplitude, said time-varying phase modulation responsive to said time-varying amplitude of said modulation signal.

19. The apparatus as defined in claim 18, wherein said time-varying amplitude of said modulation signal has a triangular wave form.

20. The apparatus as defined in claim 18, wherein said time-varying amplitude of said modulation signal is sinusoidal.

21. A method of sensing an ambient effect, comprising:
propagating first and second light waves in first and second optical paths;
combining said light waves after propagation through said optical paths to form an optical output signal;
varying the phase of said light waves to cause said optical output signal to vary in accordance with a waveform that includes two predetermined points having a time-domain separation responsive to said ambient effect; and
sensing said two predetermined points to measure said ambient effect.

22. The method of claim 21, wherein said optical paths are formed by a loop of optical fiber, and said first and second light waves counterpropagate in said loop.

23. The method of claim 21, wherein said two predetermined points comprise points of zero slope on said waveform and wherein said sensing step comprises measuring the time-domain separation between said points of zero slope.

24. The method of claim 23, wherein said sensing step comprises the steps of differentiating said waveform to provide a second waveform having zero crossings corresponding to said points of zero slope, and detecting said zero crossings to measure said time-domain separation.

25. In a Sagnac interferometer comprising a loop of optical fiber, a light source for introducing counterpropagating light waves into said loop, a coupling device that combines said counterpropagating light waves to form an optical output signal, and a modulator for modulating the phase of said counterpropagating light waves at a predetermined frequency, a detection system for detecting said output signal, comprising:
a differentiator that differentiates said output signal to provide a waveform having zero crossings corresponding to points of zero slope of said optical output signal; and
a zero crossing detector that detects zero crossings of said waveform.

26. In an interferometer having first and second optical paths for propagating first and second light waves, a coupling device that combines said light waves to form an optical output signal, and a modulator for modulating the phase of at least one of said light waves at a predetermined frequency such that said optical output signal varies in accordance with a waveform, a method of sensing an ambient effect, comprising the steps of:
measuring a time-domain separation between two predetermined points of said waveform, said points selected to have a time-domain separation that varies in response to said ambient effect; and
converting said time-domain separation into a signal indicative of the ambient effect.

27. The method of sensing, as defined by claim 26, wherein said optical paths are formed by a loop of optical fiber through which said first and second light waves counterpropagate, said method additionally comprising the step of rotating said loop of optical fiber to produce said ambient effect.

28. An interferometer for sensing an ambient effect, comprising:
means defining an optical path for propagating a pair of light waves in opposite directions about said optical path;
a light source that produces a light wave;
a modulator that modulates the phase of said pair of light waves;
a coupling device that couples said light wave to said optical path to form said pair of light waves, said coupling device combining said pair of light waves after propagation through said optical path to form an optical output signal, said output signal having an output signal waveform defined by phase differences between said light waves, said waveform including first and second predetermined point, the time domain separation between said points being responsive to said ambient effect; and
detection electronics, including a photodetector, that detects the time domain separation between said predetermined points to sense said ambient effect.

* * * * *

UNITED STATES PATENT AND TRADEMARK OFFICE
CERTIFICATE OF CORRECTION

PATENT NO. : 4,779,975

DATED : October 25, 1988

INVENTOR(S) : Byoung Y. Kim

It is certified that error appears in the above-identified patent and that said Letters Patent is hereby corrected as shown below:

In Column 2, at line 1, change "Equation 2 above. Thus" to --Equation 2 above.) Thus--.

In Column 5, at line 26, change "of the counter/time circuit" to --of the counter/timer circuit--.

In Column 5, at line 39, change "A shown in Figure 1" to --As shown in Figure 1--.

In Column 12, at line 47, change "curve 215 translates" to --curve 214 translates--.

In Column 15, at line 60, change "$\Delta t_1,$" to --$\Delta t_1',$--.

In Column 17, at line 15, change "embodiment of the detection signal" to --embodiment of the detection system--.

UNITED STATES PATENT AND TRADEMARK OFFICE
CERTIFICATE OF CORRECTION

PATENT NO. : 4,779,975

DATED : October 25, 1988

INVENTOR(S) : Byoung Y. Kim

It is certified that error appears in the above-identified patent and that said Letters Patent is hereby corrected as shown below:

In Column 17, at line 48, change "between he zero-crossings" to --between the zero-crossings--.

In Column 23, at line 16, change "modulators" to --modulator--

In Column 24, at line 48, change "point" to --points--.

Signed and Sealed this

Twenty-eighth Day of April, 1992

Attest:

HARRY F. MANBECK, JR.

*Attesting Officer*     *Commissioner of Patents and Trademarks*